(12) United States Patent
Inose

(10) Patent No.: US 12,547,068 B2
(45) Date of Patent: Feb. 10, 2026

(54) INFORMATION PROCESSING APPARATUS, INSPECTION METHOD, STORAGE MEDIUM, EXPOSURE APPARATUS, DETERMINATION METHOD, AND ARTICLE MANUFACTURING METHOD

(71) Applicant: CANON KABUSHIKI KAISHA, Tokyo (JP)

(72) Inventor: Mitsuru Inose, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 824 days.

(21) Appl. No.: 17/478,329

(22) Filed: Sep. 17, 2021

(65) Prior Publication Data

US 2022/0100081 A1    Mar. 31, 2022

(30) Foreign Application Priority Data

Sep. 28, 2020   (JP) .................................. 2020-162585

(51) Int. Cl.
| | | |
|---|---|---|
| *G03F 1/70* | (2012.01) | |
| *G03F 7/00* | (2006.01) | |
| *G06T 7/00* | (2017.01) | |

(52) U.S. Cl.
CPC .......... *G03F 1/70* (2013.01); *G03F 7/706841* (2023.05); *G06T 7/0004* (2013.01); *G06T 2207/20081* (2013.01); *G06T 2207/20084* (2013.01); *G06T 2207/30148* (2013.01)

(58) Field of Classification Search
CPC ........ G03F 1/70; G03F 7/705; G03F 7/70625; G03F 7/706841; G03F 7/70941; G06T 2207/20081; G06T 2207/20084; G06T 2207/30148; G06T 7/0004

See application file for complete search history.

(56) References Cited

U.S. PATENT DOCUMENTS

| | | | |
|---|---|---|---|
| 2017/0177760 A1* | 6/2017 | Socha ................... | G03F 7/2002 |
| 2019/0361355 A1* | 11/2019 | Takeshita ............ | G03F 7/70425 |
| 2020/0334801 A1* | 10/2020 | Takahashi ............... | A61B 1/045 |
| 2022/0187713 A1* | 6/2022 | Middlebrooks ........ | G06N 3/045 |
| 2022/0365454 A1* | 11/2022 | Yamamoto ............ | G03F 9/7092 |
| 2022/0404712 A1* | 12/2022 | Zhang ................. | G03F 7/70516 |
| 2023/0230208 A1* | 7/2023 | Lei .......................... | G06V 10/82 |
| | | | 382/155 |
| 2024/0020961 A1* | 1/2024 | Pisarenco .............. | G06V 10/82 |

FOREIGN PATENT DOCUMENTS

| | | |
|---|---|---|
| CN | 1488999 A | 4/2004 |
| CN | 104884945 A | 9/2015 |
| JP | 2000164485 A | 6/2000 |
| JP | 2019502950 A | 1/2019 |

* cited by examiner

*Primary Examiner* — Deoram Persaud
(74) *Attorney, Agent, or Firm* — Canon U.S.A., Inc. IP Division

(57) ABSTRACT

An information processing apparatus configured to inspect a developed state of a substrate includes an inspection unit configured to input a captured image of a developed second substrate to a learning model to acquire inspection data that include information indicating a second developed state of the second substrate. The learning model is obtained by learning using learning data that include a captured image of a developed first substrate and information indicating a first developed state of the first substrate.

9 Claims, 17 Drawing Sheets

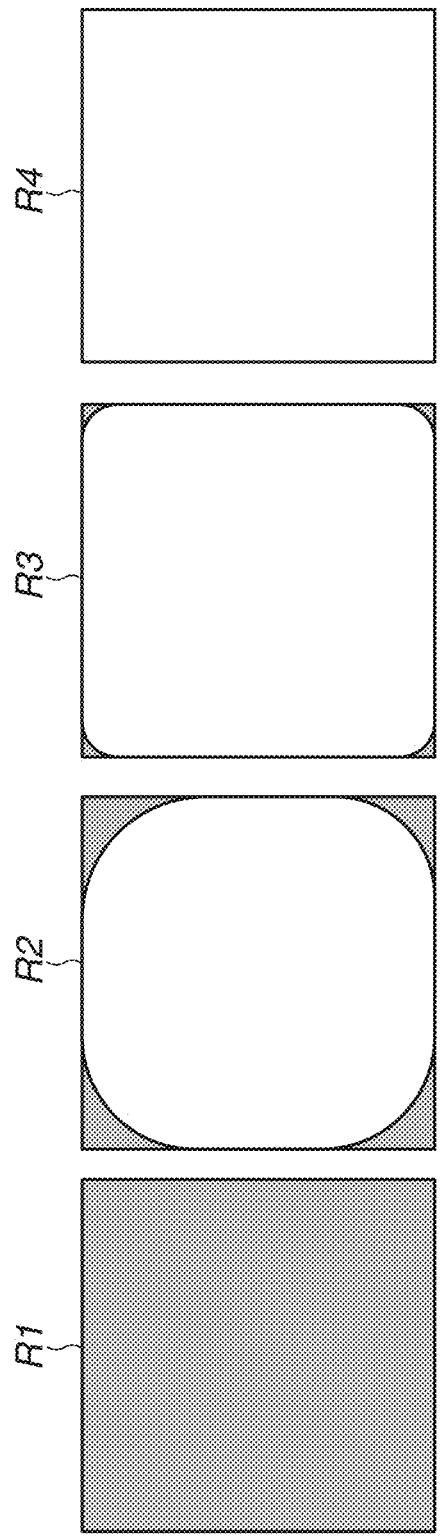

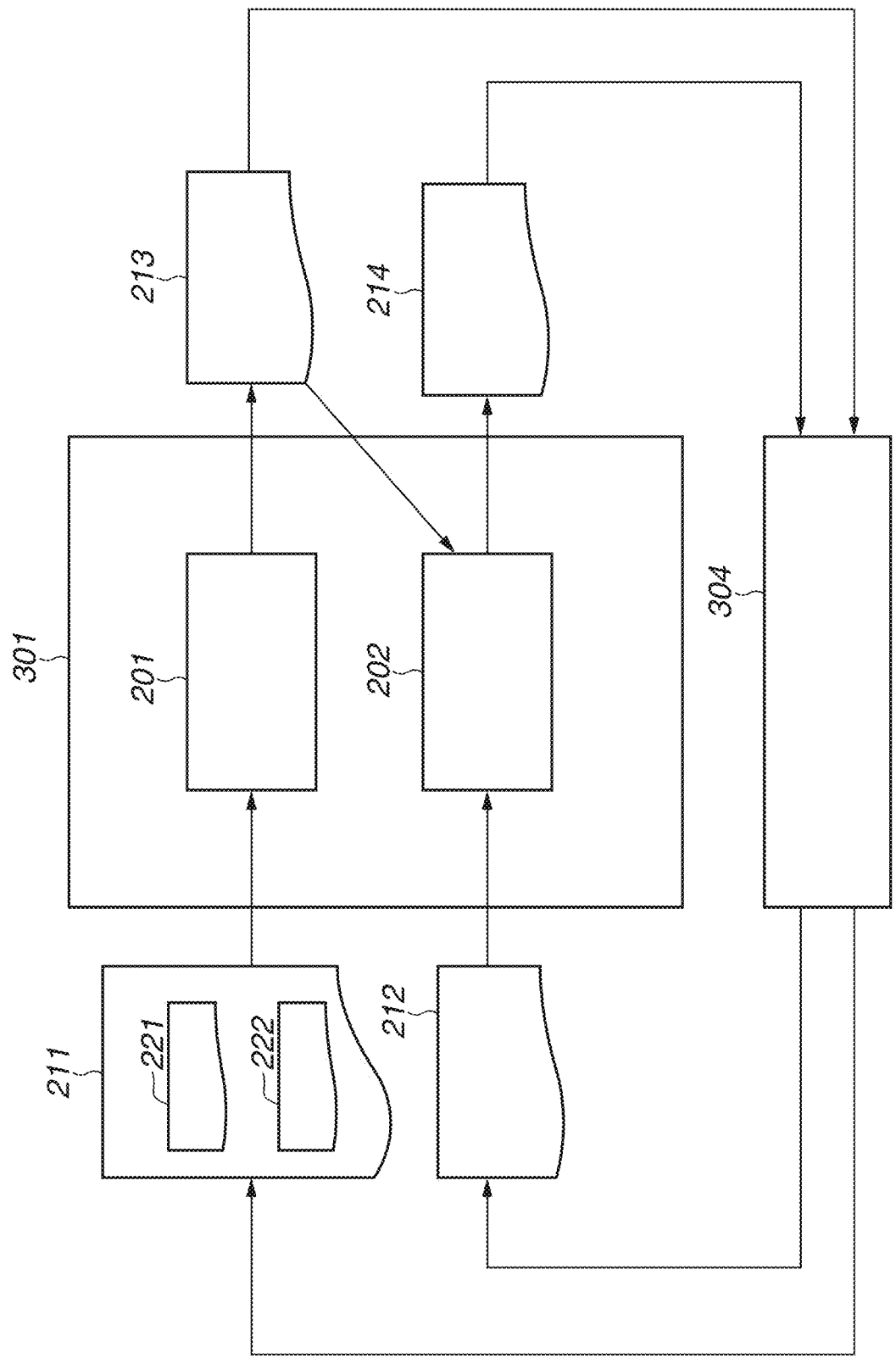

INFORMATION PROCESSING APPARATUS, INSPECTION METHOD, STORAGE MEDIUM, EXPOSURE APPARATUS, DETERMINATION METHOD, AND ARTICLE MANUFACTURING METHOD

BACKGROUND

Field of the Disclosure

The present disclosure relates to an information processing apparatus, an inspection method, a storage medium, an exposure apparatus, a determination method, and an article manufacturing method.

Description of the Related Art

In a photolithography process during manufacturing of an article such as a semiconductor device, a formation process for forming a resist film on a substrate by applying a resist thereto is performed first. Next, an exposure process for exposing the resist film formed on the substrate with light transmitted through a mask on which a pattern is formed is performed. Then, a development process for developing the exposed resist film is performed. The formation process, the exposure process, and the development process are sequentially performed, so that a pattern is formed on the substrate.

To determine exposure conditions in the exposure process, such as the amount of exposure and the size of the mask, an inspection process for inspecting the developed state of a substrate subjected to the formation process, the exposure process, and the development process under predetermined conditions is performed. The exposure conditions in the exposure process are determined based on an inspection result of the developed state of the substrate obtained in the inspection process.

Japanese Patent Application Laid-Open No. 2000-164485 discusses a resist pattern inspection method capable of, in a photolithography process, easily identifying a portion where a pattern defect is likely to occur, and an appropriate exposure amount. In such an inspection method, substrates (wafers) with and without a background pattern thereon are exposed with a pattern while the amount of exposure is increased in increments of a certain amount, so that the substrates for the inspection are created. Then, the pattern shape of the substrate without the background pattern thereon and the pattern shape of the substrate with the background pattern thereon are compared with each other, so that the portion where a pattern shape defect occurs and the exposure amount with which the pattern shape defect occurs are identified.

In the inspection method according to Japanese Patent Application Laid-Open No. 2000-164485, to identify the exposure amount with which a defect occurs, patterns of the same shape formed on substrates are compared with each other, and the portion where the patterns do not match each other is determined as a defect.

However, in the inspection method according to Japanese Patent Application Laid-Open No. 2000-164485, the influence of the pattern shape is reflected in the determination result. Thus, it is difficult to perform an inspection limited to the aspect of the optical performance of an exposure apparatus. To address this issue, in the inspection of the developed state of a substrate, the substrate is exposed without a mask on which a pattern is formed, the exposed substrate is developed, and the developed state of the substrate is inspected. In such an inspection, no pattern is formed on the developed substrate.

SUMMARY

The present disclosure is directed to providing an information processing apparatus capable of inspecting the developed state of a substrate without a pattern shape comparison. The present disclosure is also directed to an inspection method, a storage medium, an exposure apparatus, a determination method, and an article manufacturing method.

According to an aspect of the present disclosure, an information processing apparatus configured to inspect a developed state of a substrate includes an inspection unit configured to input a captured image of a developed second substrate to a learning model to acquire inspection data that include information indicating a second developed state of the second substrate, the learning model being obtained by learning using learning data that include a captured image of a developed first substrate and information indicating a first developed state of the first substrate.

Further features of the present disclosure will become apparent from the following description of exemplary embodiments with reference to the attached drawings.

BRIEF DESCRIPTION OF THE DRAWINGS

FIG. 5 is a diagram illustrating developed states of a plurality of inspection regions.

FIG. 6 is a diagram illustrating inspection processing performed by the information processing apparatus.

DESCRIPTION OF THE EMBODIMENTS

Figure 1:
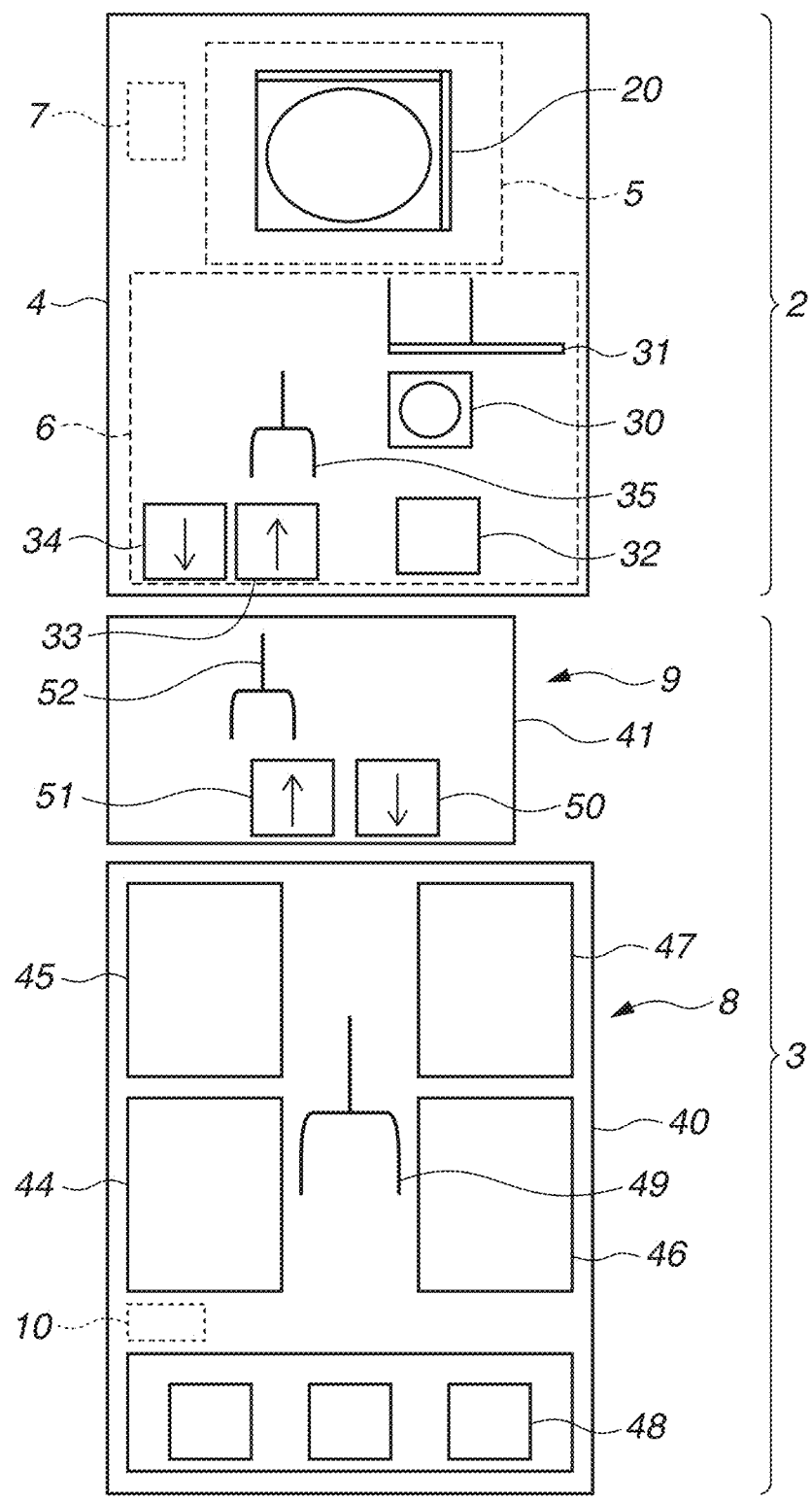
FIG. 1 is a diagram illustrating configurations of an exposure apparatus and a coating/development apparatus.

Exemplary embodiments of the present disclosure will be described in detail below with reference to the attached drawings. In the drawings, the same members are designated by the same reference numerals, and redundant descriptions thereof will be omitted.

First, configurations of an exposure apparatus and a coating/development apparatus according to a first exemplary embodiment of the present disclosure will be described. FIG. 1 illustrates the configurations of an exposure apparatus 2 and a coating/development apparatus 3 according to the present exemplary embodiment. The exposure apparatus 2 and the coating/development apparatus 3 are employed in, for example, a lithography process in semiconductor device manufacturing processes. In a clean room of a semiconductor device manufacturing factory, the exposure apparatus 2 and the coating/development apparatus 3 are installed adjacent to each other. The exposure apparatus 2 performs exposure processing for exposing a substrate (a wafer) having a resist (a photoresist) film formed on the surface, with a pattern formed on a mask (an original plate or a reticle). The coating/development apparatus 3 performs coating processing for applying a resist to the surface of the substrate, as the processing (process) preceding the exposure processing performed by the exposure apparatus 2, and also performs development processing for developing the substrate to which the pattern is transferred, as the processing (process) following the exposure processing.

<Exposure Apparatus>

Figure 2:
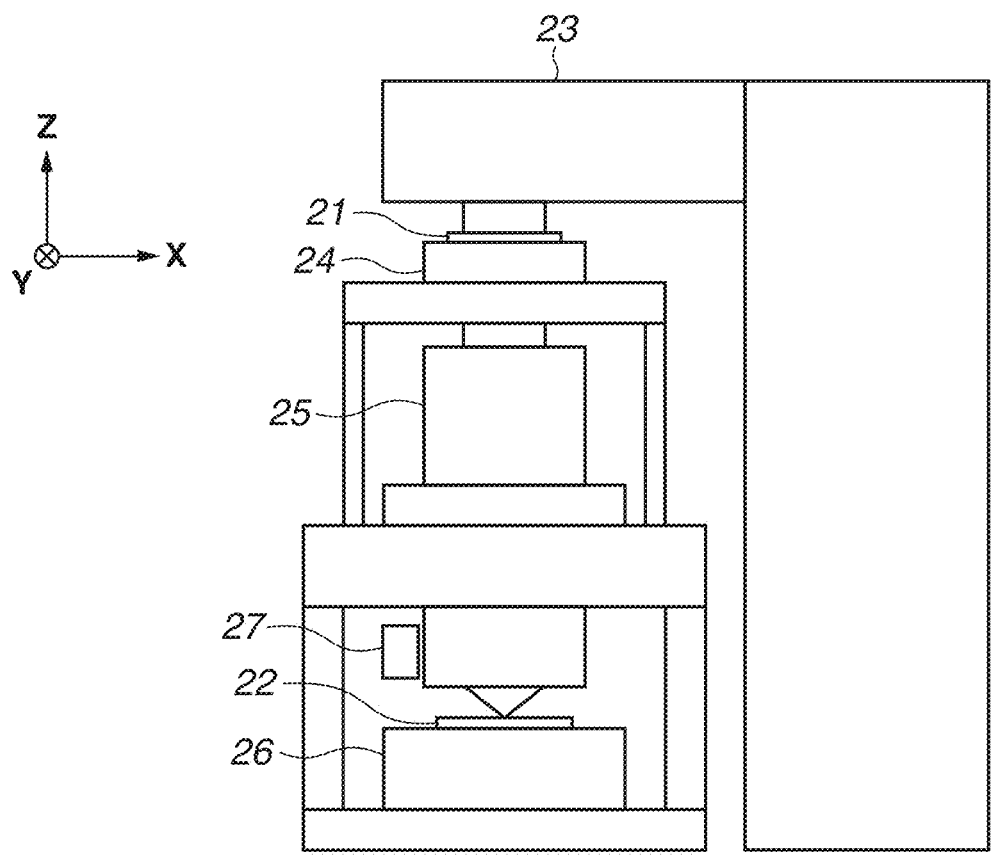
FIG. 2 is a diagram illustrating the exposure apparatus.

Next, the configuration of the exposure apparatus 2 according to the present exemplary embodiment will be described in detail. The exposure apparatus 2 includes a chamber 4 that entirely covers the exposure apparatus 2. The chamber 4 includes therein an exposure unit 5 accommodating a main body 20 that performs the exposure processing, and a substrate conveyance device (hereinafter referred to as a first conveyance device) 6 that receives and delivers a substrate from and to the coating/development apparatus 3. FIG. 2 schematically illustrates a configuration of the main body 20 installed in the exposure unit 5. The main body 20 is a projection exposure apparatus that employs a step-and-repeat method or a step-and-scan method to perform projection exposure for transferring a pattern formed on a mask 21 onto a substrate 22. The main body 20 will be described with reference to FIG. 2, assuming that a Z-axis is parallel to the optical axis of a projection optical system 25, and within a plane perpendicular to the Z-axis, a Y-axis is perpendicular to the paper surface and an X-axis is perpendicular to the Y-axis. The main body 20 includes an illumination device 23, a mask stage 24 that holds the mask 21, the projection optical system 25, a substrate stage 26 that holds the substrate 22, and an image capturing unit 27 that captures an image of a mark.

The illumination device 23 includes a light source and an illumination optical system (both of which are not illustrated) and illuminates the mask 21. As the light source, for example, a pulse light source (a laser) is used. Examples of the available laser include an argon fluoride (ArF) excimer laser with a wavelength of about 193 nm and a molecular fluorine (F2) excimer laser with a wavelength of about 153 nm. The type of the laser is not limited to an excimer laser, and for example, an yttrium aluminum garnet (YAG) laser may be used. In addition, the number of lasers is not specifically limited. In a case where the laser is used as the light source, it is desirable to use a beam shaping optical system that shapes a parallel light beam from the laser light source into a desired beam shape, or an incoherent optical system that makes a coherent laser beam incoherent. Furthermore, the available light source is not limited to a pulse light source, and a continuum light source such as one or more mercury lamps or xenon lamps can also be used. The illumination optical system includes a lens, a mirror, a light integrator, or a diaphragm.

The mask 21 is, for example, an original plate made of quartz glass. A pattern (e.g., a circuit pattern) to be transferred is formed on the mask 21. The mask stage 24 is movable in the XY direction while holding the mask 21. The projection optical system 25 projects the pattern on the mask 21 illuminated with exposure light from the illumination device 23, onto the substrate 22 at a predetermined magnification (e.g., ¼ or ⅕).

As the projection optical system 25, an optical system including only a plurality of refractive lens elements, or an optical system (a catadioptric optical system) including a plurality of refractive lens elements and at least one concave mirror can be employed. Alternatively, as the projection optical system 25, an optical system including a plurality of refractive lens elements and at least one diffractive optical element such as a kinoform, or an all-mirror optical system can be employed.

The substrate 22, which is a processing target, has a resist applied to the surface and is formed of, for example, monocrystalline silicon. The substrate stage 26 is movable in the XY direction while holding the substrate 22. For example, in a case where the step-and-scan method is employed, the mask stage 24 and the substrate stage 26 are moved in parallel in synchronization with each other.

To perform positioning (alignment) of the substrate 22 held by the substrate stage 26, the image capturing unit 27 acquires a captured image of a mark formed on the substrate 22. The image capturing unit 27 includes a light source 27a (refer to FIG. 14A) that emits light, and a camera 27b (refer to FIG. 14A) that receives light reflected by an image capturing target (the substrate 22) irradiated with the light emitted from the light source 27a and captures an image of the image capturing target. The camera 27b includes an image sensor (not illustrated) that outputs a light and shade image based on the brightness, i.e., the light and shade, of the reflected light from the substrate 22, and an analog-to-digital (A/D) converter (not illustrated) that converts the light and shade image obtained from the image sensor into a digital image signal. A first control unit 7 (described below) acquires the digital image signal, and detects the position of the mark formed on the substrate 22 using the acquired digital image signal. Based on the detected position of the mark, the first control unit 7 controls the substrate stage 26 to perform the positioning of the substrate 22. The image capturing unit 27 can also acquire a captured image of a reference mark (not illustrated) formed on the substrate stage 26, and the first control unit 7 can also detect the position of the reference mark formed on the substrate stage 26 to perform the positioning of the substrate stage 26.

The first conveyance device 6 includes a pre-alignment unit 30 that performs the positioning of the substrate 22 in advance before the exposure processing, and a supply hand 31 that supplies the substrate 22 from the pre-alignment unit 30 to the substrate stage 26 in the main body 20. The first conveyance device 6 also includes a carrier port 32 as a portion where, in a case where the substrate 22 is directly carried into the main body 20 by using an open cassette capable of storing a plurality of the substrates 22, the open cassette is placed. Alternatively, the carrier port 32 may have a structure where a Front Opening Unified Pod (FOUP), which is a sealed carrier, is placed instead of the open cassette. The first conveyance device 6 also includes a first carry-in unit 33 and a first carry-out unit 34 as a first reception/delivery portion used to receive and deliver the substrate 22 between the exposure apparatus 2 and the coating/development apparatus 3, and a conveyance hand 35 that appropriately conveys the substrate 22 to each component included in the first conveyance device 6. The conveyance hand 35 is, for example, a Selective Compliance Assembly Robot Arm (SCARA) robot. The first carry-in unit 33 is a reception/delivery unit used to carry the substrate 22 in an unexposed state out of the coating/development apparatus 3 into the exposure apparatus 2, but may also serve as a pre-alignment processing unit such as the pre-alignment unit 30 or a process processing unit such as a temperature adjustment unit. On the other hand, the first carry-out unit 34 is a reception/delivery unit used to carry the substrate 22 in an exposed state out of the exposure apparatus 2 into the coating/development apparatus 3, but may also serve as a process processing unit such as a peripheral exposure processing unit.

Furthermore, the exposure apparatus 2 includes a control unit (hereinafter referred to as the first control unit 7) that is formed of, for example, a computer, is connected to the components of the exposure apparatus 2 through a line, and is capable of controlling the components based on a program. The first control unit 7 may be formed integrally inside the exposure apparatus 2, or may be installed at a location separate from the other portions of the exposure apparatus 2.

Figure 3:
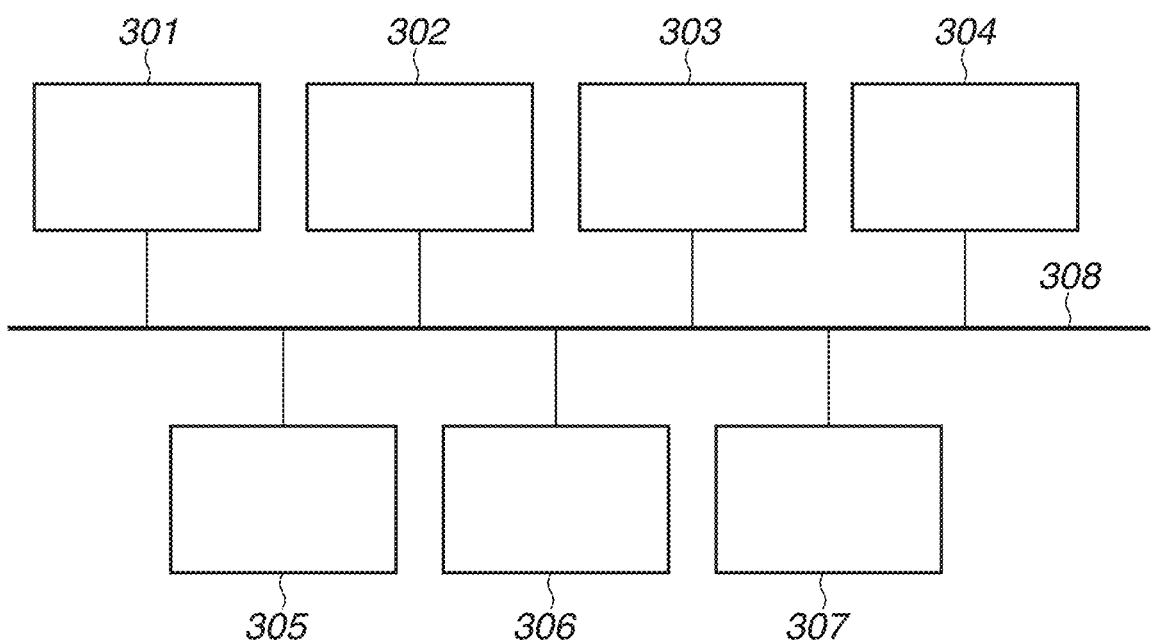
FIG. 3 is a diagram illustrating a configuration of an information processing apparatus.

FIG. 3 is a diagram illustrating a configuration of an information processing apparatus 300. The first control unit 7 can be implemented by the information processing apparatus (computer) 300 communicably connected to the coating/development apparatus 3. In FIG. 3, a processing unit 301 is a central processing unit (CPU) that executes an operating system (OS) and various application programs. The processing unit 301 is not limited to a CPU, and may be a processor or a circuit such as a microprocessing unit (MPU), a graphics processing unit (GPU), or an application-specific integrated circuit (ASIC). Alternatively, the processing unit 301 may be a processor or a circuit such as a digital signal processor (DSP), a data flow processor (DFP), or a neural processing unit (NPU). Yet alternatively, the processing unit 301 may be a combination of any of these processors or circuits. A read-only memory (ROM) 302 stores a program to be executed by the processing unit 301 and fixed data among parameters for calculation. A random-access memory (RAM) 303 provides a work area for the processing unit 301 and an area for temporarily storing data. The ROM 302 and the RAM 303 are connected to the processing unit 301 via a bus 308. The information processing apparatus 300 also includes an input device (input unit) 305 including a mouse and a keyboard, and a display device (display unit) 306 such as a cathode ray tube (CRT) or a liquid crystal display. Alternatively, the input device 305 and the display device 306 may be an integrated device such as a touch panel. Yet alternatively, the input device 305 and the display device 306 may be configured separately from the information processing apparatus 300. The information processing apparatus 300 also includes a storage device 304 such as a hard disk device, a compact disc (CD), a digital versatile disc (DVD), or a memory card. The storage device 304 stores various programs and various types of data. Each of the input device 305, the display device 306, and the storage device 304 is connected to the bus 308 via an interface (not illustrated). A communication device 307 for connecting to a network and performing communication is also connected to the bus 308. The communication device 307 is used to, for example, connect to a local area network (LAN), perform data communication according to a communication protocol such as the Transmission Control Protocol/Internet Protocol (TCP/IP), and communicate with another communication device. The communication device 307 functions as a data transmission unit and a data reception unit. For example, the communication device 307 receives data from the coating/development apparatus 3 and stores the data in the storage device 304.

<Coating/Development Apparatus>

Next, the configuration of the coating/development apparatus 3 according to the present exemplary embodiment will be described in detail. As illustrated in FIG. 1, the coating/development apparatus 3 includes a coating/development processing unit 8 installed in a chamber 40, and a substrate conveyance device (hereinafter referred to as a second conveyance device) 9 that is installed in a chamber 41 and receives and delivers the substrate 22 from and to the exposure apparatus 2. The coating/development processing unit 8 includes, as process processing units for the substrate 22, a coating unit 44, a heating unit 45, a development unit 46, and a cooling unit 47. The coating unit 44 employs, for example, a spin coater. The coating unit 44 rotates the substrate 22 in a state where a resist is dripped on the surface of the substrate 22 that is horizontally placed, thereby forming a uniform resist film thereon. The heating unit 45 performs prebaking on the substrate 22 before the exposure processing, and performs post-exposure baking on the substrate 22 subjected to the exposure processing. The prebaking is heat treatment to be performed to, after a resist is applied to the surface of the substrate 22, evaporate a residual solvent in the resist film and increase the adhesion between the resist film and the surface of the substrate 22. Since the prebaking is performed on the substrate 22 in an unexposed state (before the exposure processing), it is desirable that the prebaking should be performed at a temperature where polymerization does not occur in polymer processing or an additive is not thermally decomposed. On the other hand, the post-exposure baking is heat treatment to be performed on the substrate 22 after the exposure processing and before the development processing in order to reduce the deformation of the resist pattern due to a standing wave effect in a case where the substrate 22 is exposed with light of a single wavelength. Furthermore, the post-exposure baking has the effect of promoting a catalytic reaction after exposure of a chemically amplified resist. As a method for the baking processing performed by the heating unit 45, a resistance heating method or an infrared heating method can be employed.

The development unit 46 develops the substrate 22 subjected to the exposure processing. As a method for the development processing performed by the development unit 46, a spin method or a spray method can be employed. The cooling unit 47 employs, for example, a cooling plate that is cooled by the circulation of cooling water and cools the substrate 22 in a heated state. As another method for the cooling processing performed by the cooling unit 47, electron cooling using a Peltier effect can also be employed. Furthermore, the coating/development processing unit 8 includes a carrier port 48 as a portion where a carrier such as an open cassette or a FOUP is placed, and a conveyance hand 49 that appropriately conveys the substrate 22 between the carrier and the process processing units. The conveyance hand 49 is, for example, a SCARA robot. Such an open cassette or a FOUP can be conveyed by a person guided vehicle (PGV) in the clean room and automatically carried into and out of the carrier port 48. Alternatively, a configuration in which an open cassette or a FOUP is placed in the carrier port 48 from above in the clean room by overhead hoist transport (OHT) may be used.

The second conveyance device 9 includes a second carry-in unit 50 and a second carry-out unit 51 as a second reception/delivery portion used to receive and deliver the substrate 22 between the exposure apparatus 2 and the coating/development apparatus 3. The second conveyance device 9 also includes a conveyance hand 52 that appropriately conveys the substrate 22 between the second carry-in unit 50 and the second carry-out unit 51, and the first carry-in unit 33 and the first carry-out unit 34 that are installed in the first conveyance device 6. The conveyance hand 52 is, for example, a SCARA robot. The second carry-in unit 50 is a reception/delivery unit used to carry the substrate 22 subjected to the exposure processing out of the exposure apparatus 2 into the coating/development processing unit 8. On the other hand, the second carry-out unit 51 is a reception/delivery unit used to carry the substrate 22 in an unexposed state out of the coating/development processing unit 8 into the exposure apparatus 2.

Furthermore, the coating/development apparatus 3 includes a control unit (hereinafter referred to as a second control unit 10) that is formed of, for example, a computer, is connected to the components of the coating/development apparatus 3 through a line, and is capable of controlling the components based on a program. Similarly to the first control unit 7, the second control unit 10 is formed of, for example, the information processing apparatus 300 illustrated in FIG. 3. The second control unit 10 may be formed integrally inside the coating/development apparatus 3, or may be installed at a location separate from the other portions of the coating/development apparatus 3.

Next, the processing operations of the exposure apparatus 2 and the coating/development apparatus 3 will be described. In the following description, it is assumed that one lot of 25 pieces of the substrates 22 is stored as the processing targets in the open cassette, and is conveyed to the carrier port 48 of the coating/development processing unit 8 in the coating/development apparatus 3. First, in the coating/development processing unit 8, the conveyance hand 49 acquires the substrates 22 from the open cassette placed in the carrier port 48 and conveys the substrates 22 to the coating unit 44. The coating unit 44 applies a resist to each of the substrates 22 carried into the coating unit 44. The conveyance hand 49 then carries the substrate 22 with the resist applied thereto out of the coating unit 44 and conveys the substrate 22 to the heating unit 45. The heating unit 45 performs the prebaking processing on the substrate 22. After completion of the prebaking processing on the substrate 22, the conveyance hand 49 carries the substrate 22 out of the heating unit 45 and conveys the substrate 22 to the cooling unit 47. The cooling unit 47 performs the cooling processing on the substrate 22. At this time, it is desirable to adjust the temperature of the substrate 22 to be carried into the exposure apparatus 2 later to a temperature that does not affect the inside of the chamber 4 of the exposure apparatus 2, i.e., an air-conditioning system temperature in the main body 20, as a target temperature. In the exposure apparatus 2 according to the present exemplary embodiment, if a temperature adjustment unit is installed in the first carry-in unit 33 in the first conveyance device 6, the temperature of the substrate 22 carried out of the coating/development apparatus 3 into the exposure apparatus 2 can be finally and finely adjusted in the exposure apparatus 2. In this case, in the cooling unit 47, the temperature of the substrate 22 may be made close to the target temperature to some extent, and may be slightly higher than the final target temperature.

Next, the conveyance hand 49 carries the substrate 22 cooled to the desired target temperature out of the cooling unit 47 and conveys the substrate 22 to the second carry-out unit 51. As described above, the conveyance hand 49 sequentially acquires the substrates 22 stored in the open cassette and conveys the substrates 22 to the process processing units. The conveyance hand 52 in the second conveyance device 9 conveys the substrates 22 held by the second carry-out unit 51 to the first carry-in unit 33 in the first conveyance device 6 in the exposure apparatus 2.

Next, in the first conveyance device 6 on the other side, the first carry-in unit 33 adjusts the temperature of the substrate 22 to a predetermined temperature as described above by using the temperature adjustment unit inside the first carry-in unit 33. After the temperature adjustment of the substrate 22 is completed, the conveyance hand 35 carries the substrate 22 out of the first carry-in unit 33 and conveys the substrate 22 to the pre-alignment unit 30. In the pre-alignment unit 30, the substrate 22 is placed on a stage inside the pre-alignment unit 30 and rotated by a driving system (not illustrated). At this time, a detector such as a charge-coupled device (CCD) sensor detects an edge portion of the substrate 22. Based on the output from the detector, the first control unit 7 calculates the direction of a notch, the center of the substrate 22, and the amount of eccentricity. Then, the pre-alignment unit 30 finally adjusts the direction of a notch portion formed in the substrate 22 to a predetermined direction. After completion of the pre-alignment processing on the substrate 22, the supply hand 31 carries the substrate 22 out of the pre-alignment unit 30 and supplies the substrate 22 to the substrate stage 26 in the main body 20. The main body 20 performs the exposure processing on the substrate 22.

After completion of the exposure processing on the substrate 22, the conveyance hand 35 acquires the substrate 22 subjected to the exposure processing from the substrate stage 26 and conveys the substrate 22 to the first carry-out unit 34. The conveyance hand 52 in the second conveyance device 9 conveys the substrate 22 from the first carry-out unit 34 to the second carry-in unit 50. Subsequently, the conveyance hand 49 in the coating/development processing unit 8 conveys the substrate 22 from the second carry-in unit 50 to the heating unit 45. The heating unit 45 performs the post-exposure baking processing on the substrate 22 carried into the heating unit 45. After completion of the post-exposure baking processing on the substrate 22, the conveyance hand 49 carries the substrate 22 out of the heating unit 45 and conveys the substrate 22 to the development unit 46. The development unit 46 performs the development processing on the substrate 22. After completion of the development processing on the substrate 22, the conveyance hand 49 carries the substrate 22 out of the development unit 46 into a predetermined slot of the open cassette placed in the carrier port 48.

In inspection processing according to the present exemplary embodiment, first, a substrate to be used for the inspection (hereinafter referred to as an inspection substrate S) is prepared. The inspection substrate S is conveyed to the coating/development apparatus 3 and is subjected to the coating processing by the coating/development apparatus 3, so that a resist film is formed on the inspection substrate S. The inspection substrate S on which the resist film is formed is conveyed to the exposure apparatus 2 and is subjected to the exposure processing by the exposure apparatus 2, so that the resist film is exposed. At this time, the exposure apparatus 2 sequentially exposes a plurality of inspection regions on the inspection substrate S while changing the exposure amount, without a mask on which a pattern is formed. The inspection substrate S subjected to the exposure processing is conveyed to the coating/development apparatus 3 again and is subjected to the development processing by the coating/development apparatus 3, so that a part of the resist film on the inspection substrate S is removed.

Figure 4:
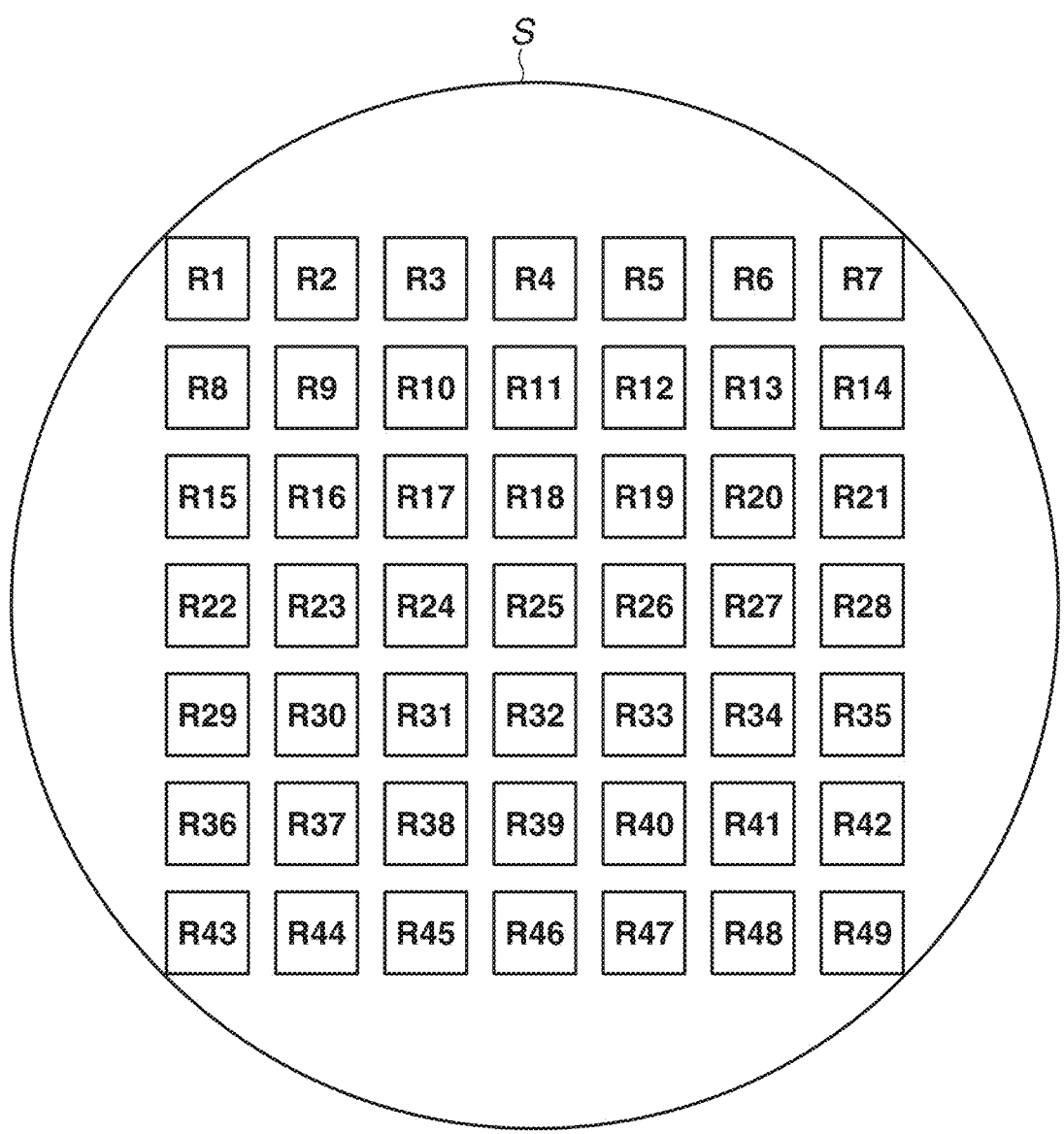
FIG. 4 is a diagram illustrating inspection regions on an inspection substrate.

FIG. 4 is a diagram illustrating inspection regions on the inspection substrate S. In the example of FIG. 4, inspection regions R1 to R49 are formed on the inspection substrate S. The sizes, the number, and the positions of the inspection regions, however, are not limited to this example. In the exposure processing, the inspection regions R1 to R49 are sequentially exposed with different exposure amounts.

If the exposure amount in the exposure processing is insufficient, the development processing is not sufficiently performed on the inspection region, and the resist film partially remains in the inspection region. FIG. 5 illustrates the developed states of a plurality of inspection regions. More specifically, the example of FIG. 5 illustrates the developed states of the inspection regions R1 to R4. FIG. 5 also illustrates an example where the exposure amount is increased in the order of the inspection regions R1 to R4 in the exposure processing. The exposure amounts for the inspection regions R1 to R4 are E1 to E4, respectively. In the inspection region R1, which is exposed with the smallest exposure amount E1 among the exposure amounts E1 to E4, the resist film remains across the region. In the inspection region R2, which is exposed with the second smallest exposure amount E2, the resist film partially remains at and around the four corners. In the inspection region R3, which is exposed with the third smallest exposure amount E3, the resist film partially remains at and around the four corners. The portions of the inspection region R3 where the resist film remains are smaller than the portions of the inspection region R2 where the resist film remains. In the inspection region R4, which is exposed with the largest exposure amount E4 among the exposure amounts E1 to E4, the resist film is removed from the entire region and does not remain at all.

The above description is based on the premise that the portion of the resist film exposed in the exposure processing is removed in the development processing. If the resist film is formed of a positive resist, the portion of the resist film exposed in the exposure processing is removed in the development processing. If, on the other hand, the resist film is formed of a negative resist, the portion other than the portion of the resist film exposed in the exposure processing is removed in the development processing. In a case where the resist film is formed of a negative resist, FIG. 5 illustrates an example where the exposure amount is decreased in the order of the inspection regions R1 to R4.

As described above, the residual state of the developed resist film (hereinafter referred to as the developed state) in each of the inspection regions R1 to R4 on the inspection substrate S is inspected, whereby it is possible to acquire the relationships between the developed states and the exposure amounts E1 to E4 in the inspection regions R1 to R4 on the inspection substrate S.

Conventionally, to determine the developed states in inspection regions on the inspection substrate S, a person having technical knowledge and experience observes the inspection regions on the inspection substrate S by using a scanning electron microscope (SEM) or an optical microscope. In a case where a plurality of the persons performs the inspection, a criterion for determining whether the resist film is removed to an appropriate level in the inspection regions differs depending on the person who performs the inspection, and variations occur in the determination results.

To address this issue, in the inspection processing according to the present exemplary embodiment, an image of an inspection region on the inspection substrate S is input to a learning model obtained by machine learning, and information indicating the developed state of the inspection region is output from the learning model.

FIG. 6 is a diagram illustrating the inspection processing performed by the information processing apparatus 300. The inspection processing according to the present exemplary embodiment is performed by the information processing apparatus 300 illustrated in FIG. 3. Alternatively, the inspection processing according to the present exemplary embodiment may be performed by the first control unit 7 of the exposure apparatus 2 or the second control unit 10 of the coating/development apparatus 3, or may be performed by another information processing apparatus (not illustrated).

The processing unit 301 includes a learning unit 201 and an inspection unit 202. The learning unit 201 obtains a learning model 213 by learning using learning data 211 acquired from the storage device 304.

The learning data 211 include, as input data 221, captured images of inspection regions on an inspection substrate (a first substrate) subjected to the development processing. The learning data 211 also include, as teacher data 222, information indicating the developed states of the inspection regions on the inspection substrate subjected to the development processing. The information indicating the developed states of the inspection regions can be numerical information indicating the developed states of the inspection regions. For example, regarding the developed states of the inspection regions R1 to R4 illustrated in FIG. 5, the developed state of the inspection region R1 can be indicated as 0%, the developed state of the inspection region R2 can be indicated as 33%, the developed state of the inspection region R3 can be indicated as 66%, and the developed state of the inspection region R4 can be indicated as 100%.

Alternatively, the information indicating the developed states of the inspection regions can be information indicating whether each of the developed states of the inspection regions is acceptable. For example, regarding the developed states of the inspection regions R1 to R4 illustrated in FIG. 5, the developed states of the inspection regions R1 and R2 can be indicated as fail, and the development states of the inspection regions R3 and R4 can be indicated as pass. The learning data 211 are information including a plurality of combinations of the input data 221 and the teacher data 222. The information indicating the developed states of the inspection regions included in the teacher data 222 is acquired, for example, based on the result of inspection of the developed states of the inspection regions by a person observing the images of the inspection regions included in the input data 221.

Based on the images of the inspection regions on the inspection substrate subjected to the development processing, the portion where the resist film is removed in the development processing and the portion where the resist film remains can be distinguished from each other as illustrated in FIG. 5. In a case where the resist film is formed of a positive resist, the larger the portion where the resist film is removed is, the better the developed state is. On the other hand, in a case where the resist film is formed of a negative resist, the larger the portion other than the portion where the resist film is removed is, the better the developed state is. The images of the inspection regions on the inspection substrate subjected to the development processing are in correlation to the developed states of the inspection regions. As described above, the developed states of the inspection regions also have relationships with the exposure amounts in the exposure processing. Thus, the images of the inspection regions on the inspection substrate subjected to the development processing are also in correlation to the exposure amounts in the exposure processing.

Figure 7A:
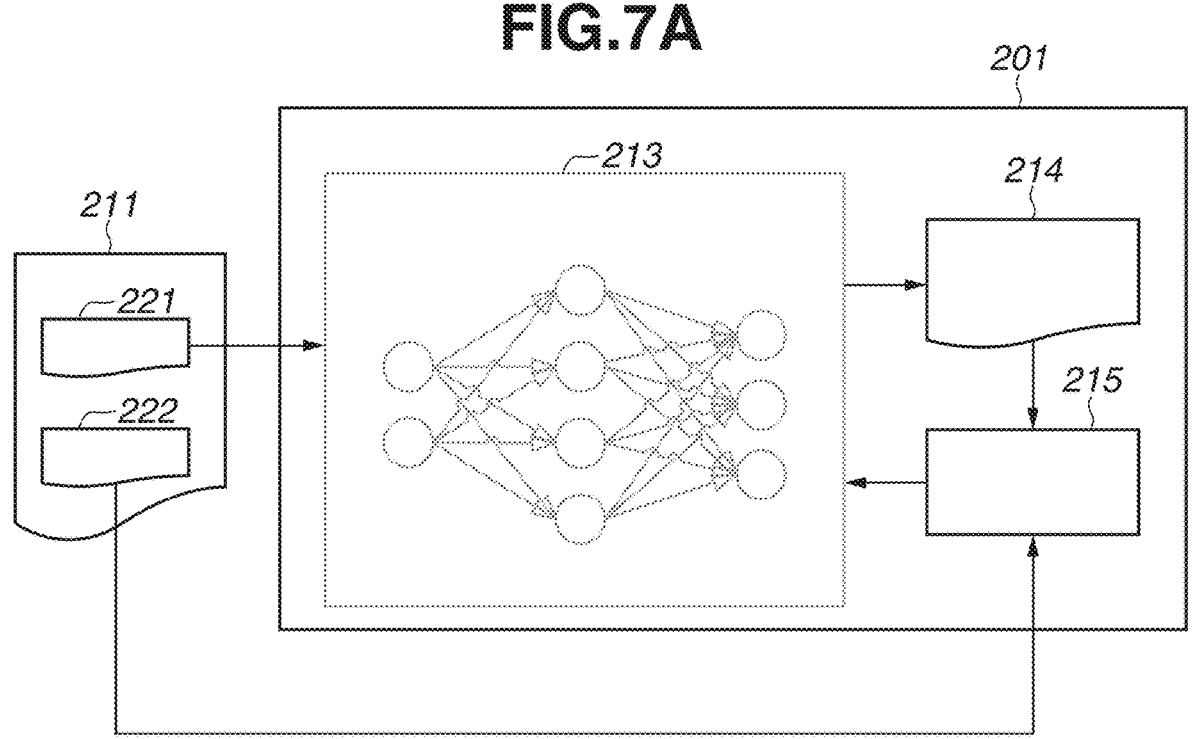
FIGS. 7A and 7B are diagrams illustrating flows of data in a learning unit and an inspection unit, respectively.
Figure 7B:
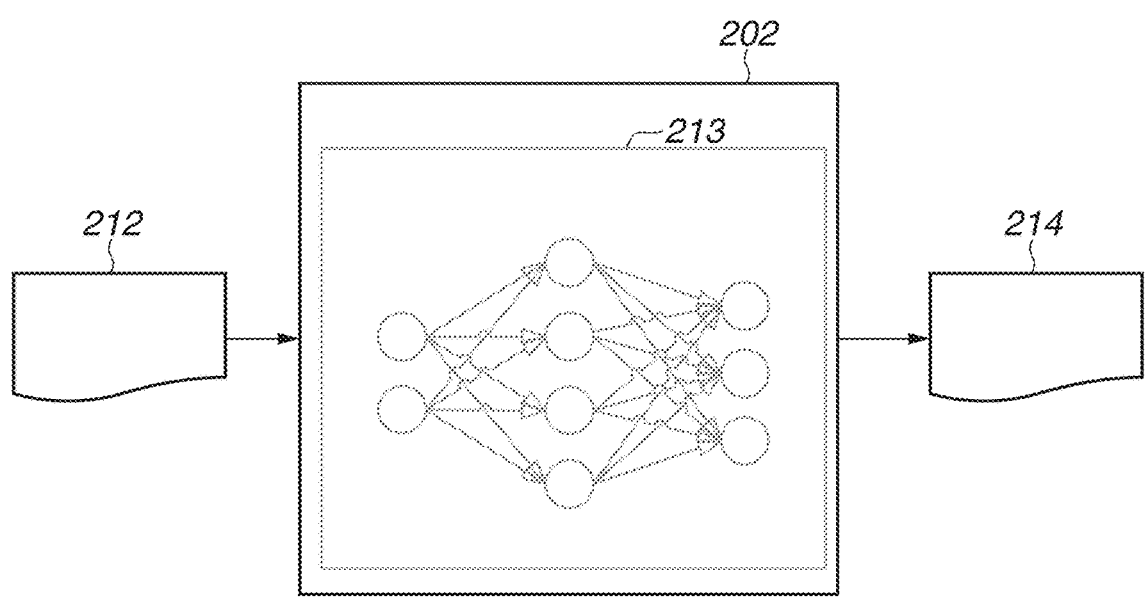

FIGS. 7A and 7B illustrates the flows of data in the learning unit 201 and the inspection unit 202, respectively. The learning unit 201 obtains the learning model 213 by performing machine learning using the learning data 211 that indicates the relationship between the input data 221 and the teacher data 222. Then, the inspection unit 202 inputs new input data 212 to the obtained learning model 213, thereby outputting inspection data 214 as output data.

The learning model 213 can be formed of, for example, a neural network. The neural network here refers to a model having a multi-layer network structure including an input layer, an intermediate layer, and an output layer. The learning model 213 is not necessarily formed of a neural network, and may be formed of another model such as a support vector machine. The learning model 213 may include a model that acquires the input data 221 and the inspection data 214 by using a table or a polynomial indicating the relationship between the input data 221 and the inspection data 214.

Figure 8:
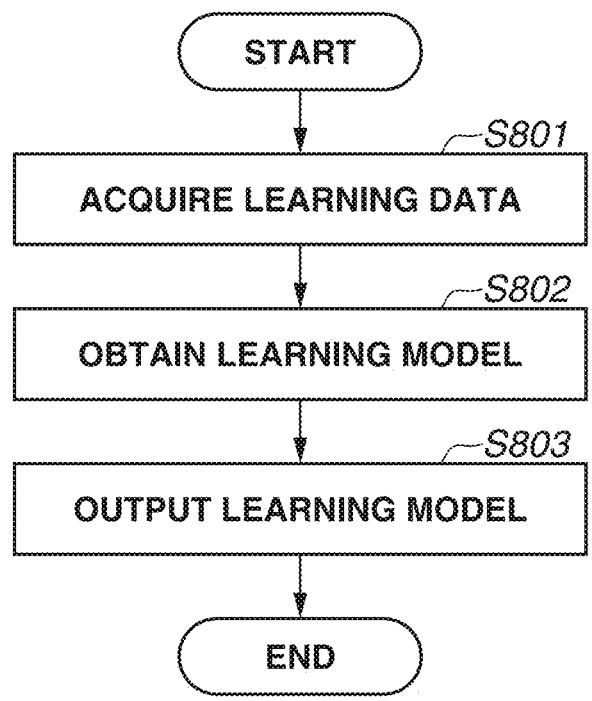
FIG. 8 is a flowchart illustrating learning processing performed by the learning unit.

Learning processing performed by the learning unit 201 will be described next. FIG. 8 is a flowchart illustrating the learning processing performed by the learning unit 201. In step S801, the learning unit 201 acquires the learning data 211 from the storage device 304. The learning unit 201 may acquire the learning data 211 from the RAM 303, or may acquire the learning data 211 saved in an external storage device (not illustrated) via the communication device 307.

In step S802, the learning unit 201 performs machine learning to obtain the learning model 213. For example, in a case where the learning model 213 is formed of a neural network, the learning unit 201 obtains the learning model 213 by using an algorithm such as backpropagation. The learning unit 201 obtains the learning model 213 by optimizing a connection weight coefficient in the neural network. The backpropagation is a technique for adjusting a connection weight coefficient between nodes of each neural network so that the error between the output data and the teacher data 222 is minimized.

FIG. 7A illustrates how data flows when the learning unit 201 performs machine learning to obtain the learning model 213. The learning unit 201 obtains the error between the teacher data 222 and the inspection data 214 that is output from the output layer of the neural network based on the input data 221 input to the input layer. Using a loss function 215, the learning unit 201 calculates the error between the inspection data 214 from the neural network and the teacher data 222. Based on the obtained error, the learning unit 201 updates the connection weight coefficient between the nodes of the neural network so that the error is smaller than a predetermined allowable value, thereby obtaining the learning model 213 to which the updated connection weight coefficient is applied.

In step S803, the learning unit 201 outputs the learning model 213 obtained in step S802 to the inspection unit 202. The learning unit 201 may save the learning model 213 in the storage device 304, and the inspection unit 202 may acquire the saved learning model 213. Alternatively, the learning model 213 may be saved in the RAM 303, or may be saved in an external storage device (not illustrated) via the communication device 307.

Figure 9:
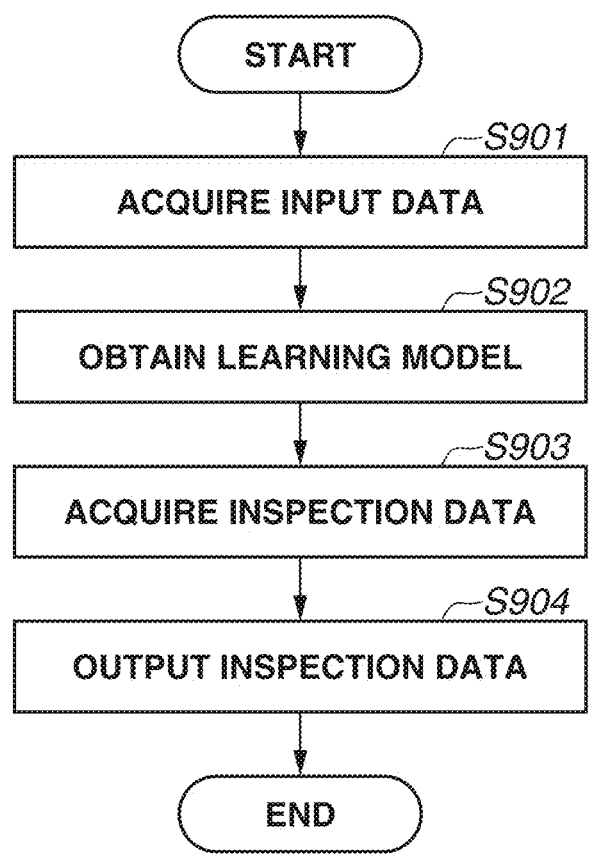
FIG. 9 is a flowchart illustrating inspection processing performed by the inspection unit.

Inspection processing performed by the inspection unit 202 will be described next. FIG. 9 is a flowchart illustrating the inspection processing performed by the inspection unit 202. In step S901, the inspection unit 202 acquires the input data 212 from the storage device 304. At this time, the inspection unit 202 may acquire the input data 212 from the RAM 303, or may acquire the input data 212 saved in an external storage device (not illustrated) via the communication device 307. The input data 212 include captured images of inspection regions on an inspection substrate (a second substrate). The details of the input data 212 are similar to those of the input data 221 included in the learning data 211.

In step S902, the inspection unit 202 obtains the learning model 213 from the learning unit 201. The inspection unit 202 may obtain the learning model 213 from the RAM 303, or may obtain the learning model 213 saved in an external storage device (not illustrated) via the communication device 307.

In step S903, the inspection unit 202 inputs the input data 212 acquired in step S901 to the learning model 213 obtained in step S902, thereby acquiring the inspection data 214 output from the learning model 213. The inspection data 214 include information indicating the developed states of the inspection regions on the inspection substrate subjected to the development processing. The information indicating the developed states of the inspection regions can be numerical information indicating the developed states of the inspection regions. Alternatively, the information indicating the developed states of the inspection regions can be information indicating whether each of the developed states of the inspection regions is acceptable. The details of the inspection data 214 are similar to those of the teacher data 222 included in the learning data 211. The inspection unit 202 saves the inspection data 214 in the storage device 304. Alternatively, the inspection data 214 may be saved in the RAM 303, or may be saved in an external storage device (not illustrated) via the communication device 307.

FIG. 7B illustrates how data flows when the inspection unit 202 acquires the inspection data 214. The inspection unit 202 acquires the inspection data 214 that are output from the learning model 213 based on the input data 212 input to the learning model 213. For example, in a case where the learning model 213 is formed of a neural network, the inspection data 214 output from the output layer based on the input data 212 input to the input layer and based on the connection weight coefficient between the nodes is acquired.

In step S904, the inspection unit 202 outputs the inspection data 214 acquired in step S903 to the display device 306.

Figure 10:
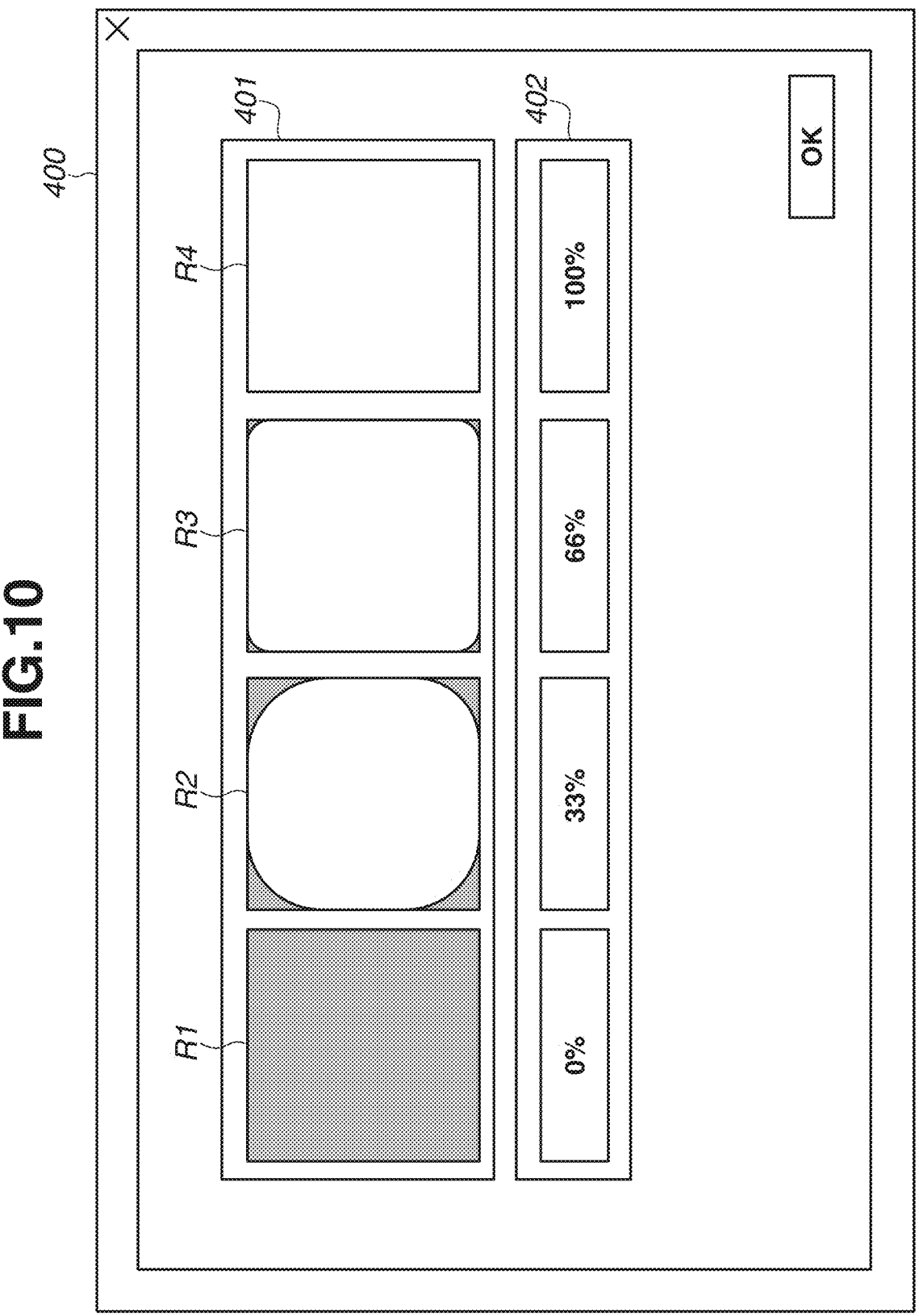
FIG. 10 is a diagram illustrating a screen displayed by a display device.

The display device 306 displays, on a screen, the inspection data 214 output from the inspection unit 202. FIG. 10 illustrates a screen 400 displayed by the display device 306. The screen 400 includes a display region 401 that displays the captured images of the inspection regions on the inspection substrate, which are included in the input data 212, and a display region 402 that displays the information indicating the developed states of the inspection regions on the inspection substrate subjected to the development processing, which is included in the inspection data 214. FIG. 10 illustrates an example where numerical information indicating the developed states of the inspection regions is displayed as the information indicating the developed states of the inspection regions on the inspection substrate subjected to the development processing. However, the information indicating the developed states of the inspection regions on the inspection substrate subjected to the development processing is not limited thereto. For example, information indicating whether each of the developed states of the inspection regions is acceptable may be displayed on the display region 402, as the information indicating the developed states of the inspection regions on the inspection substrate subjected to the development processing. Alternatively, on the display region 402, the numerical information indicating each of the developed states of the inspection regions may be displayed, and at least one of the background color, the text color, and the font of the numerical information indicating each of the developed states of the inspection regions may be changed to display the information indicating whether each of the developed states of the inspection regions is acceptable.

Figure 11:
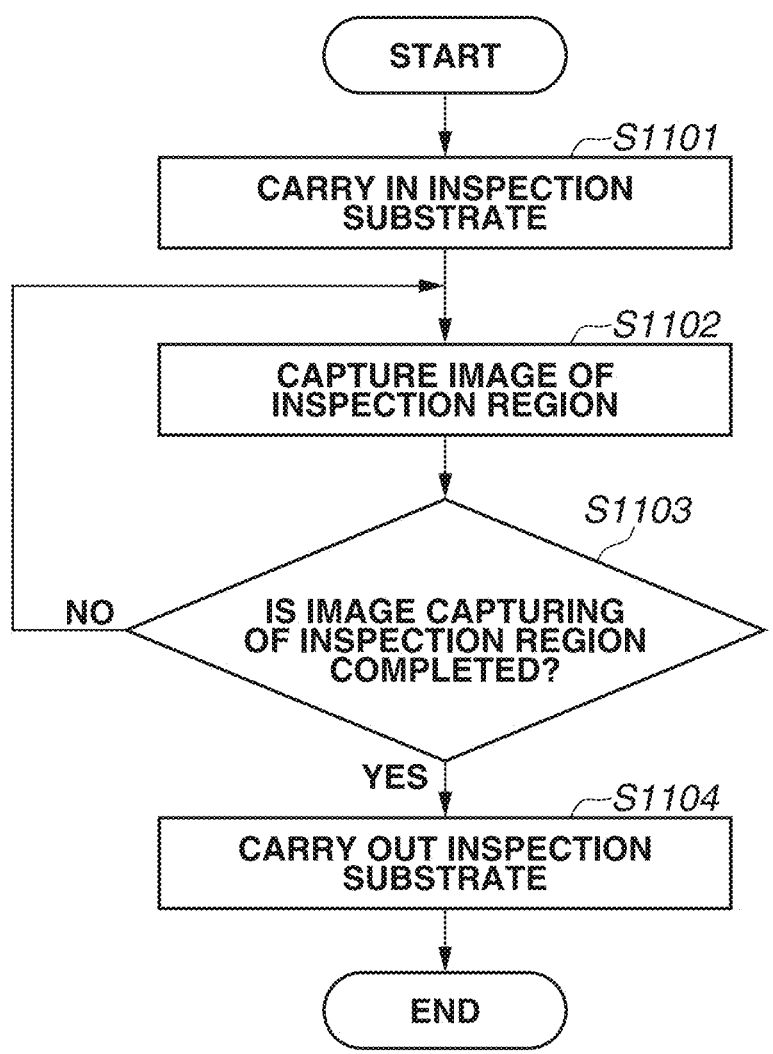
FIG. 11 is a flowchart illustrating image capturing processing on an inspection region.

A method for acquiring the captured images of the inspection regions on the inspection substrate subjected to the development processing, which are included in each of the input data 221 and the input data 212, will be described now. FIG. 11 is a flowchart illustrating image capturing processing on an inspection region. An example where the exposure apparatus 2 performs the image capturing processing on the inspection region will be described with reference to FIG. 11. Alternatively, the image capturing processing may be performed by another apparatus (not illustrated) including an image capturing unit, such as an inspection apparatus that inspects a substrate. An example where the image capturing unit 27 for capturing an image of a mark formed on the substrate 22 is used will be described with reference to FIG. 11. Alternatively, another image capturing unit (not illustrated) placed in the exposure apparatus 2 may be used.

In step S1101, the first control unit 7 of the exposure apparatus 2 causes the first conveyance device 6 to convey the inspection substrate S to the substrate stage 26. At this point, the inspection substrate S has already been subjected to processing up to the development processing.

In step S1102, the first control unit 7 moves the substrate stage 26 so that an inspection region on the inspection substrate S is located in an imaging region of the image capturing unit 27. Then, the first control unit 7 causes the image capturing unit 27 to capture an image of the inspection region on the inspection substrate S. The first control unit 7 saves, in the storage device 304, image data of the captured image of the inspection region on the inspection substrate S. Alternatively, the first control unit 7 may save the image data of the captured image of the inspection region on the inspection substrate S, in the RAM 303 or in an external storage device (not illustrated) via the communication device 307.

The imaging region for capturing an image of an inspection region on the inspection substrate S can be optionally set. For example, the imaging region can be set to entirely include the inspection substrate S illustrated in FIG. 4. Alternatively, as illustrated in FIG. 5, the imaging region can be set to include some of all the inspection regions. In this way, a wide imaging region can be set to acquire an image including a plurality of inspection regions at a time, and this makes it possible to shorten the time for the image capturing processing.

Figure 12:
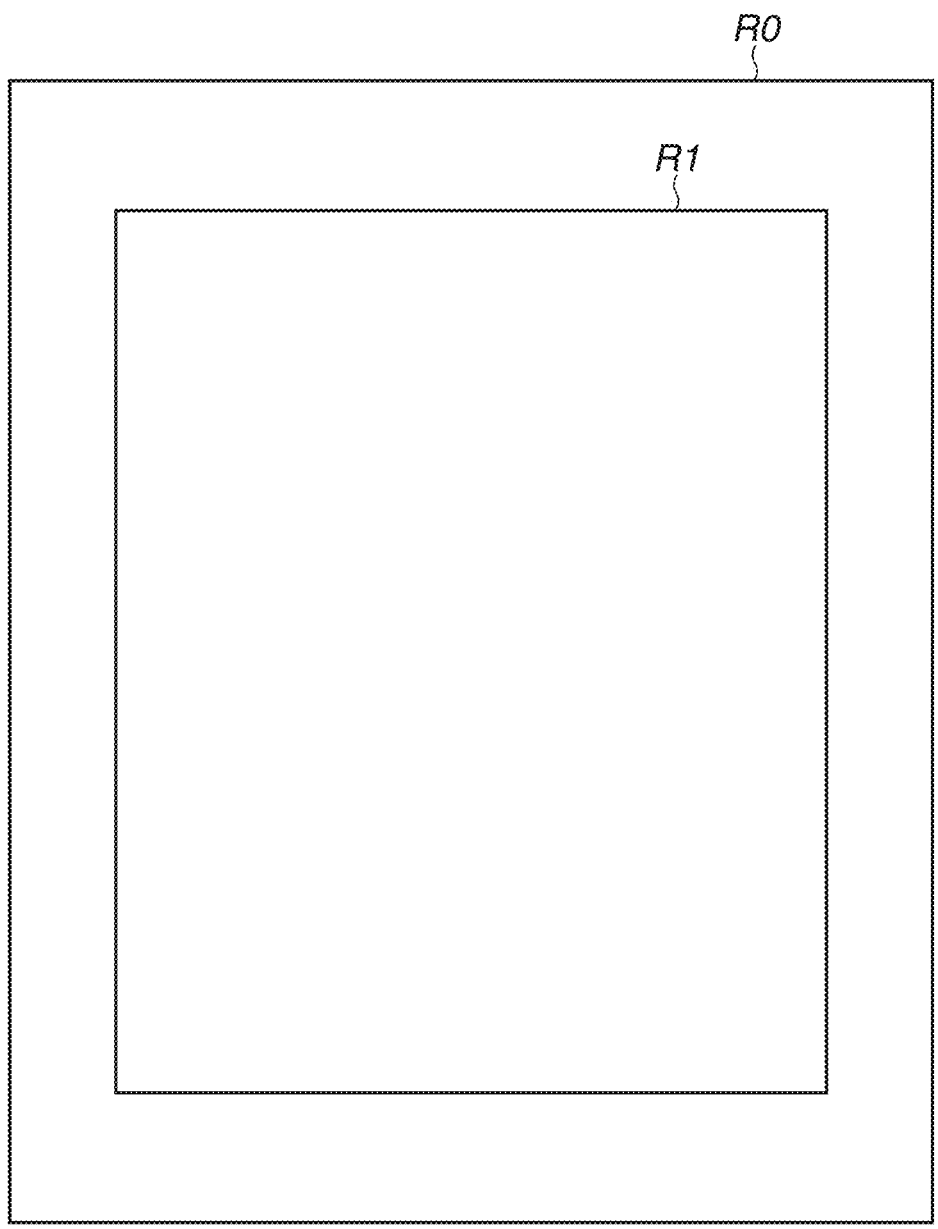
FIG. 12 is a diagram illustrating an imaging region including a single inspection region.

Alternatively, as illustrated in FIG. 12, an imaging region R0 can be set to include the single inspection region R1. In this way, an imaging region narrower than an imaging region including a plurality of inspection regions can be set to acquire a high-definition image, and this makes it possible to improve the inspection accuracy.

Figure 13:
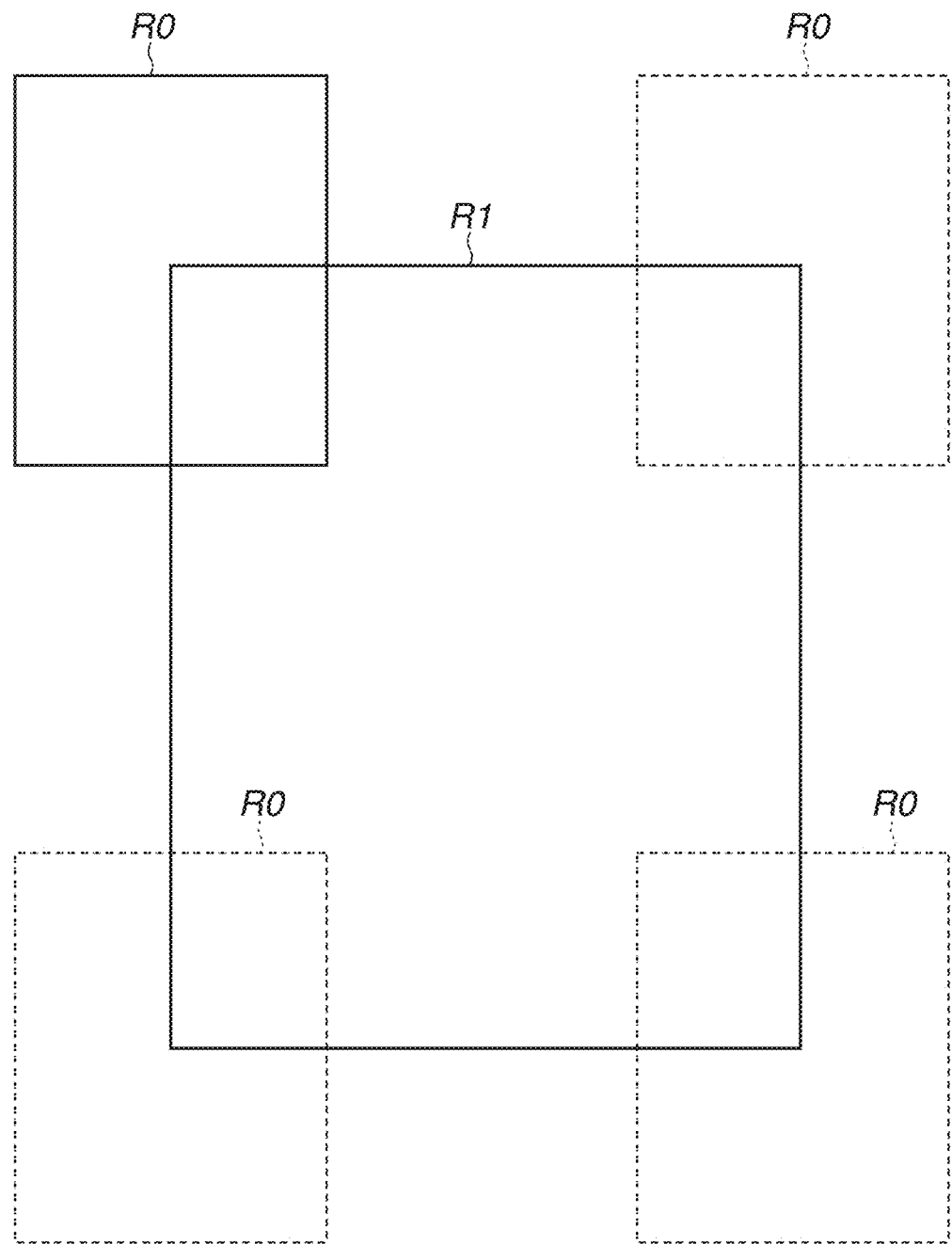
FIG. 13 is a diagram illustrating a plurality of imaging regions for a single inspection region.

Yet alternatively, as illustrated in FIG. 13, a plurality of the imaging regions R0 can be set for the single inspection region R1. In this way, even narrower imaging regions can be set to acquire high-definition images, and this makes it possible to further improve the inspection accuracy. At this time, it is desirable that regions including the four corners of the rectangular inspection region R1 should be set as the imaging regions R0. This is because, as illustrated in the inspection regions R2 and R3 in FIG. 5, the resist film remains at the four corners. Setting the regions including the four corners as the imaging regions R0 makes it possible to more accurately determine whether the resist film remains depending on the exposure amount.

Figure 14A:
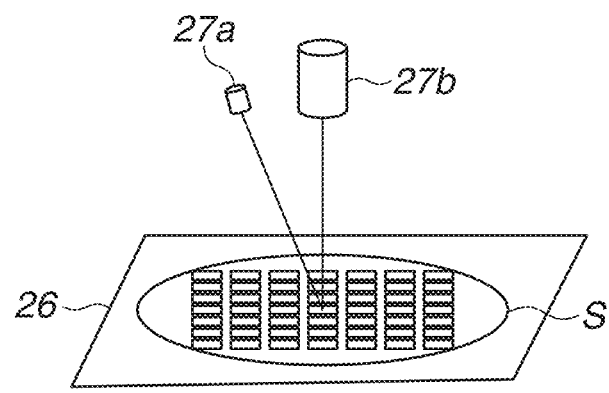
FIGS. 14A to 14D are diagrams illustrating image capturing of a substrate by an image capturing unit.

The image capturing unit 27 can acquire a plurality of images while changing an imaging condition for capturing an image of an inspection region on the inspection substrate S. FIGS. 14A to 14D illustrate image capturing of the inspection substrate S by the image capturing unit 27. More specifically, FIG. 14A illustrates a state where the light source 27a of the image capturing unit 27 emits light to the inspection region on the inspection substrate S held by the substrate stage 26, and the camera 27b receives light reflected on the inspection region and captures an image of the inspection region.

Figure 14B:
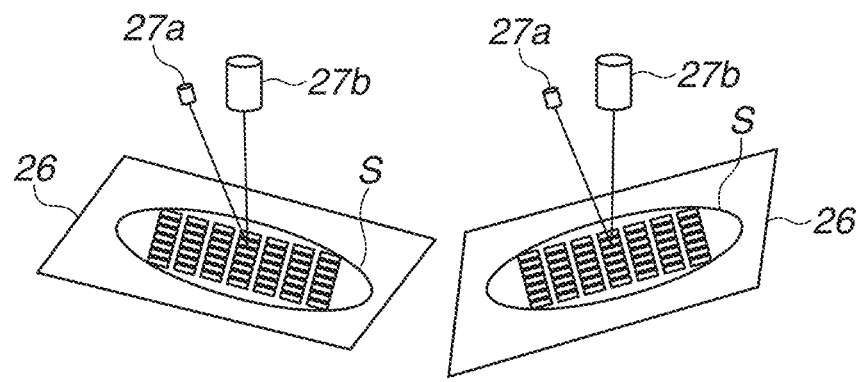

FIG. 14B illustrates a state where the image capturing unit 27 captures images of the inspection region while changing the angle of the substrate stage 26 as the imaging condition. The image capturing unit 27 can perform image capturing while setting a plurality of angles as the angle of the substrate stage 26, thereby acquiring a plurality of images of a single inspection region.

Figure 14C:
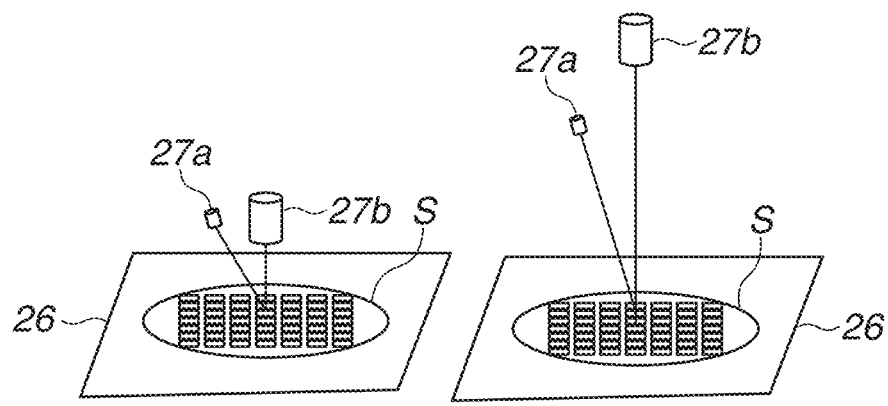

FIG. 14C illustrates a state where the image capturing unit 27 captures images of the inspection region while changing the distance from the image capturing unit 27 to the inspection region on the inspection substrate S as the imaging condition. The image capturing unit 27 can perform image capturing while setting a plurality of distances as the distance to the inspection region, thereby acquiring a plurality of images of a single inspection region. Alternatively, the distance from at least one of the light source 27a and the camera 27b of the image capturing unit 27 to the inspection region on the inspection substrate S may be changed. Yet alternatively, in a case where the camera 27b has a focal length change function, the focal length of the camera 27b may be changed instead of changing the distance from the image capturing unit 27 to the inspection region.

Figure 14D:
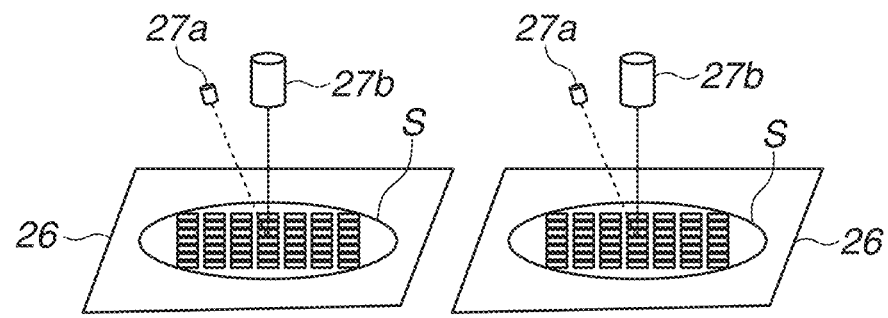

FIG. 14D illustrates a state where the image capturing unit 27 captures images of the inspection region while changing an illumination condition such as the wavelength or amount of light emitted from the light source 27a as the imaging condition. The image capturing unit 27 can perform image capturing while setting a plurality of illumination conditions as the illumination condition, thereby acquiring a plurality of images of a single inspection region.

As described above, it is possible to acquire a plurality of images of a single inspection region. Accordingly, the learning unit 201 can obtain the learning model 213 with an increased number of pieces of the learning data 211. This improves the accuracy of the inspection result indicated by the inspection data 214 output from the obtained learning model 213. In addition, the inspection unit 202 can acquire the inspection data 214 with an increased number of pieces of the input data 212. This makes it possible to acquire a plurality of pieces of the inspection data 214 and perform an inspection using the plurality of pieces of inspection data 214. As a result, the accuracy of the inspection result is improved. As the imaging conditions, at least two of the angle of the substrate stage 26, the distance to the inspection region, and the illumination condition may be combined together, and the image capturing unit 27 may capture images of the inspection region while changing the imaging conditions.

Returning to the description of FIG. 11, in step S1103, the first control unit 7 determines whether the image capturing of the inspection region on the inspection substrate S is completed. In a case where image capturing of a plurality of inspection regions is set in advance, or in a case where image capturing under a plurality of imaging conditions is set in advance, the first control unit 7 repeats the image capturing. If the first control unit 7 determines that the image capturing of the inspection region on the inspection substrate S is not completed (NO in step S1103), the processing returns to step S1102. If the first control unit 7 determines that the image capturing of the inspection region on the inspection substrate S is completed (YES in step S1103), the processing proceeds to step S1104.

In step S1104, the first control unit 7 causes the first conveyance device 6 to carry the inspection substrate S out of the substrate stage 26.

As described above, the information processing apparatus 300 according to the present exemplary embodiment is capable of inputting an image of a substrate to the learning model 213 to acquire information indicating the developed state of the substrate, thereby making it possible to inspect the developed state of the substrate subjected to the development processing.

Next, an information processing apparatus according to a second exemplary embodiment will be described. Items that are not mentioned in the present exemplary embodiment conform to the first exemplary embodiment. In the present exemplary embodiment, based on the inspection data 214 acquired in step S903 in the flowchart in FIG. 9, the inspection unit 202 determines an exposure amount with which the substrate 22 is to be exposed by the exposure apparatus 2.

Figure 15:
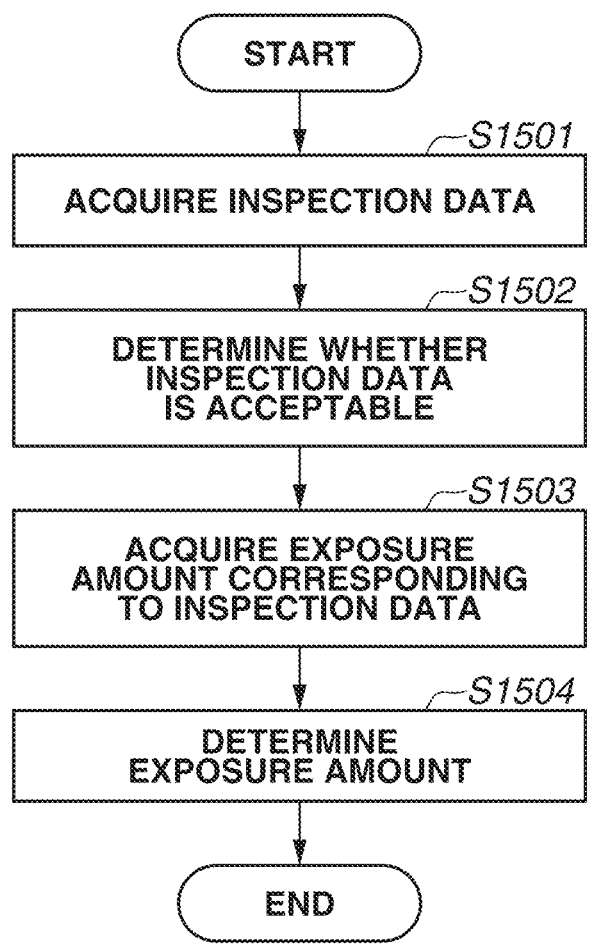
FIG. 15 is a flowchart illustrating exposure amount determination processing.

FIG. 15 is a flowchart illustrating exposure amount determination processing. In step S1501, the inspection unit 202 acquires the inspection data 214 from the storage device 304. As described in the first exemplary embodiment, the inspection data 214 include the information indicating the developed states of the inspection regions. For example, the information indicating the developed states of the inspection regions can be numerical information indicating the developed states of the inspection regions or information indicating whether each of the developed states of the inspection regions is acceptable.

In step S1502, the inspection unit 202 determines whether the acquired inspection data 214 are acceptable. For example, in a case where the inspection data 214 include numerical information indicating each of the developed states of the inspection regions, the inspection unit 202 determines whether the numerical value indicating the developed state of the inspection region is within a predetermined allowable range. If the inspection data 214 include information indicating whether the developed state of the inspection region is acceptable (pass or fail), the inspection unit 202 determines whether the developed state of the inspection region is acceptable.

In step S1503, the inspection unit 202 acquires an exposure amount corresponding to the inspection data 214 determined as acceptable. For example, the inspection unit 202 acquires, from among the inspection data 214 acquired in step S1501, the inspection data 214 in which the numerical value indicating the developed state of the inspection region is determined to be within the predetermined allowable range, as the inspection data 214 determined as acceptable. Alternatively, for example, the inspection unit 202 acquires the inspection data 214 in which the developed state of the inspection region is determined as pass, as the inspection data 214 determined as acceptable. Next, the inspection unit 202 acquires the exposure amount with which the inspection region in the image included in the input data 221 corresponding to the inspection data 214 determined as acceptable is exposed. It is assumed here that the exposure amount with which the inspection region is exposed is stored together with the image of the inspection region in advance in the storage device 304.

In step S1504, based on the exposure amount acquired in step S1503, the inspection unit 202 determines the exposure amount with which the substrate 22 is to be exposed by the exposure apparatus 2. In a case where a plurality of pieces of the inspection data 214 are acquired as the inspection data 214 determined as acceptable, the inspection unit 202 determines the smallest exposure amount among the acquired plurality of exposure amounts, as the exposure amount with which the substrate 22 is to be exposed by the exposure apparatus 2.

As described above, the information processing apparatus according to the present exemplary embodiment is capable of inputting an image of a substrate to the learning model 213 to acquire information indicating the developed state of the substrate, thereby making it possible to inspect the developed state of the substrate subjected to the development processing. Furthermore, based on the inspection result of the developed state of the substrate subjected to the development processing, it is possible to determine the exposure amount with which the substrate 22 is to be exposed by the exposure apparatus 2.

Next, an information processing apparatus according to a third exemplary embodiment will be described. Items that are not mentioned in the present exemplary embodiment conform to the first exemplary embodiment. In the present exemplary embodiment, based on the inspection data 214 acquired in step S903 of FIG. 9, the inspection unit 202 acquires the inspection data 214 for inspecting whether a flare occurs in the exposure apparatus 2.

Figure 16:
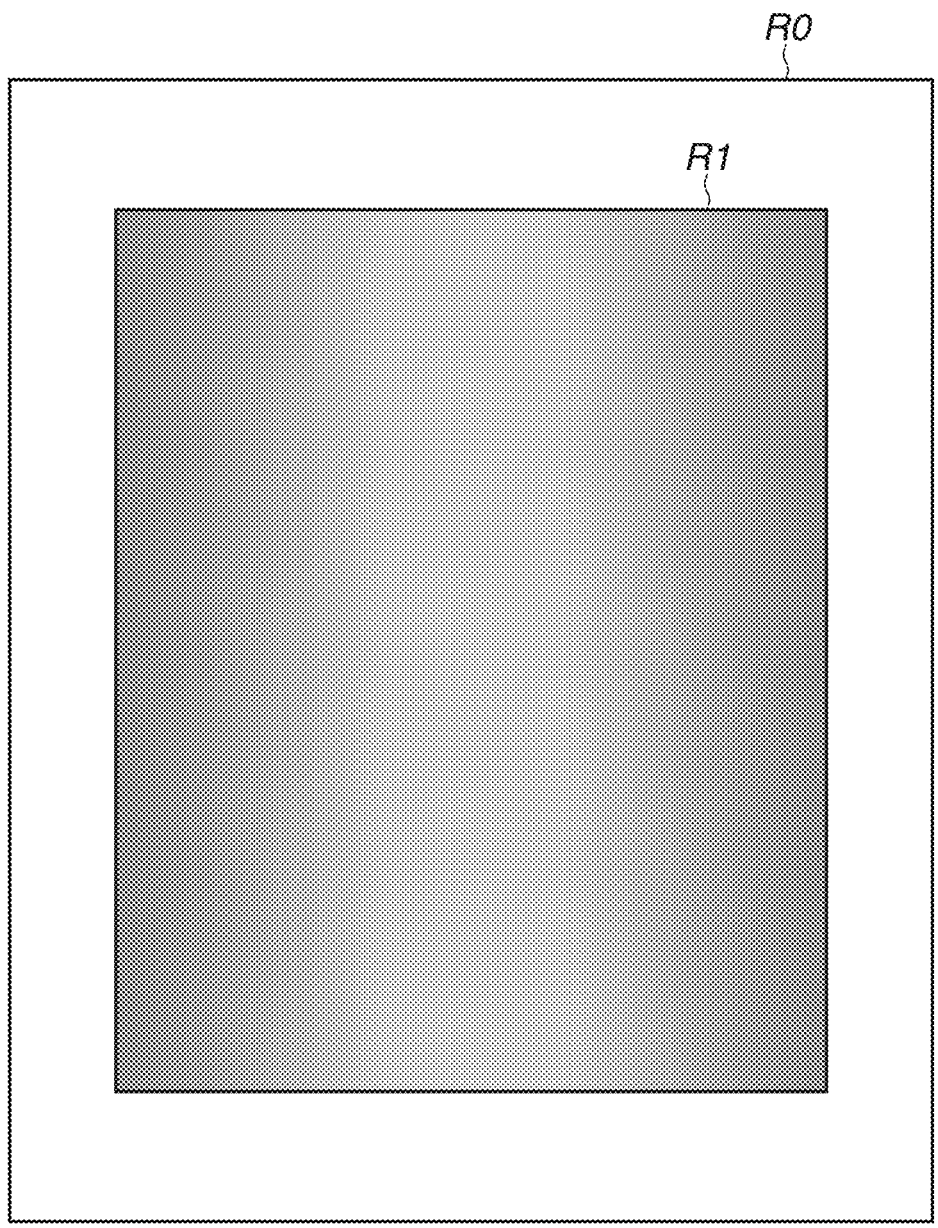
FIG. 16 is a diagram illustrating a captured image of an inspection region exposed in a state where a flare occurs.

FIG. 16 illustrates a captured image of the inspection region R1 exposed in a state where a flare occurs. For example, in a case where the inspection region R1 is exposed by the exposure apparatus 2 in a state where a flare occurs, a unique pattern appears in the captured image of the inspection region R1 on the inspection substrate S subjected to the development processing, as illustrated in FIG. 16.

Considering the above issue, as information indicating the developed state of the inspection region R1, information indicating whether a flare has occurred during the exposure of the inspection substrate S is included in the teacher data 222 of the learning data 211. This enables the learning model 213 obtained by the learning unit 201 to output the information indicating whether a flare has occurred, as the inspection data 214. Accordingly, when the inspection unit 202 inputs, to the learning model 213, the input data 212 including the captured image of the inspection region R1 on the inspection substrate S, the inspection unit 202 can acquire the inspection data 214 including the information indicating whether a flare has occurred during the exposure of the inspection substrate S.

As described above, the information processing apparatus according to the present exemplary embodiment is capable of inputting an image of a substrate to the learning model 213 to inspect whether a flare has occurred during the exposure of the substrate.

Next, an information processing apparatus according to a fourth exemplary embodiment will be described. Items that are not mentioned in the present exemplary embodiment conform to the first exemplary embodiment. In the present exemplary embodiment, based on the inspection data 214 acquired in step S903 of FIG. 9, the inspection unit 202 acquires the inspection data 214 for inspecting whether an abnormality occurs in an optical element included in the exposure apparatus 2.

Figure 17:
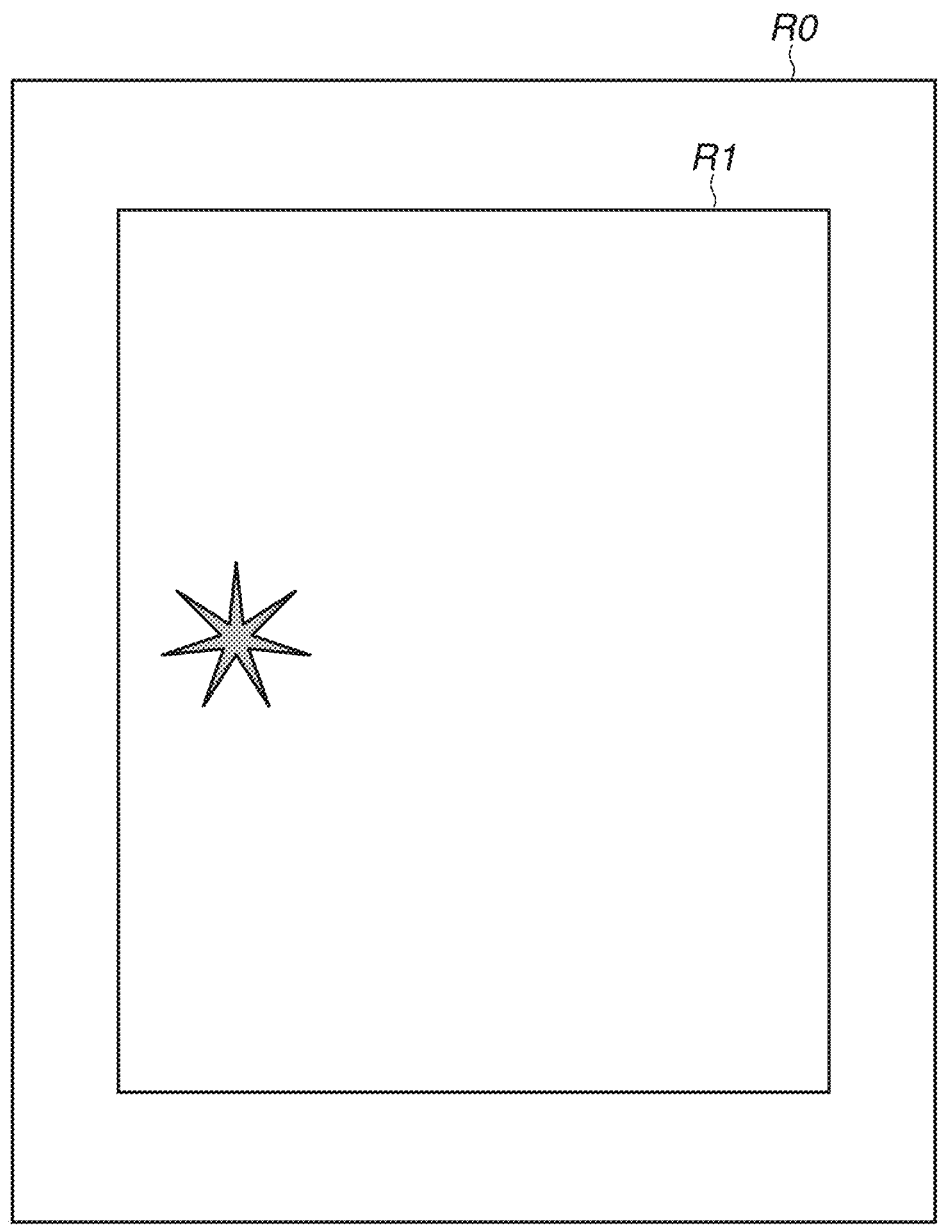
FIG. 17 is a diagram illustrating a captured image of an inspection region exposed in a state where an abnormality occurs in an optical element.

FIG. 17 illustrates a captured image of the inspection region R1 exposed in a state where an abnormality occurs in an optical element. For example, in a case where the inspection region R1 is exposed in a state where there is a scratch in the optical element included in the exposure apparatus 2, or in a state where a foreign substance is attached to the optical element, a region having a unique shape appears in the captured image of the inspection region R1 on the inspection substrate S subjected to the development processing, as illustrated in FIG. 17. Examples of the optical element included in the exposure apparatus 2 include optical elements included in the illumination device 23 and the projection optical system 25 of the exposure apparatus 2.

Considering the above issue, as information indicating the developed state of the inspection region R1, information indicating whether an abnormality occurs in the optical element is included in the teacher data 222 of the learning data 211. This enables the learning model 213 obtained by the learning unit 201 to output the information indicating whether an abnormality occurs in the optical element, as the inspection data 214. Accordingly, when the inspection unit 202 inputs, to the learning model 213, the input data 212 including the captured image of the inspection region R1 on the inspection substrate S, the inspection unit 202 can acquire the inspection data 214 including the information indicating whether an abnormality occurs in the optical element.

As described above, the information processing apparatus according to the present exemplary embodiment is capable of inputting an image of a substrate to the learning model 213 to inspect whether an abnormality occurs in the optical element included in the exposure apparatus 2 that has exposed the substrate.

A method for manufacturing an article such as a device (e.g., a semiconductor device, a magnetic storage medium, or a liquid crystal display device), a color filter, or a hard disk will be described next. The article manufacturing method includes the process of forming a pattern on a substrate (a wafer, a glass plate, or a film substrate) using an exposure apparatus. The article manufacturing method further includes the process of processing the substrate on which the pattern is formed. The processing process includes the step of removing the remaining film of the pattern. The processing step may also include another known step such as the step of etching the substrate using the pattern as a mask. The article manufacturing method according to the present exemplary embodiment is advantageous over a conventional method in at least one of the performance, quality, productivity, and production cost of the article.

The above-described first to fourth exemplary embodiments can be carried out not only separately, but also in any combination thereof.

According to the above-described exemplary embodiments, it is possible to provide an information processing apparatus capable of inspecting the developed state of a substrate, an inspection method, a storage medium, an exposure apparatus, a determination method, and an article manufacturing method.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-162585, filed Sep. 28, 2020, which is hereby incorporated by reference herein in its entirety.

What is claimed is:

1. An information processing apparatus configured to inspect a developed state of a substrate, the information processing apparatus comprising:

an inspection unit configured to obtain a learning model learned using learning data including each image of a plurality of rectangular first areas captured in a state where the plurality of rectangular first areas exposed with each different amount of exposure without a mask on which a pattern is formed is developed and information indicating a first developed state of the plurality of rectangular first areas, and input an image of a second area captured in a state where the second area is developed after exposure to the learning model to acquire inspection data that include information indicating a second developed state of the second area, wherein the each image of the plurality of rectangular first areas, is an image capturing a region including each of four corners of the rectangular first areas, wherein the inspection unit performs an acceptable-or-not-acceptable determination for each of the plurality of rectangular first areas, acquires information on exposure amounts corresponding respectively to rectangular first areas determined as acceptable, and determines a smallest exposure amount among the acquired exposure amounts as an exposure amount to be used.

2. The information processing apparatus according to claim 1, further comprising a learning unit configured to obtain the learning model by performing the learning using the learning data, wherein the inspection unit acquires the inspection data using the obtained learning model.

3. The information processing apparatus according to claim 1, wherein the information indicating the first developed state includes information indicating whether the first developed state is acceptable and the information indicating the second developed state includes information indicating whether the second developed state is acceptable.

4. The information processing apparatus according to claim 1, wherein the information indicating the first developed state includes information indicating the first developed state with a numerical value and the information indicating the second developed state includes information indicating the second developed state with a numerical value.

5. The information processing apparatus according to claim 1, wherein the information indicating the first developed state includes information indicating whether a flare has occurred during exposure of the plurality of rectangular first areas, and the information indicating the second developed state includes information indicating whether a flare has occurred during exposure of the second area.

6. The information processing apparatus according to claim 1, wherein the information indicating the first developed state includes information indicating whether an abnormality has occurred in an optical element included in an exposure apparatus having exposed the plurality of rectangular first areas, and the information indicating the second developed state includes information indicating whether an abnormality has occurred in an optical element included in an exposure apparatus having exposed the second area.

7. A non-transitory computer-readable storage medium storing a program for causing a computer to execute a method for inspecting a developed state of a substrate, the method comprising:
  obtaining a learning model learned using learning data including each image of a plurality of rectangular first areas captured in a state where the plurality of rectangular first areas exposed with each different amount of exposure without a mask on which a pattern is formed is developed and information indicating a first developed state of the plurality of rectangular first areas, and inputting an image of a second area captured in a state where the second area is developed after exposure to the learning model to acquire inspection data that include information indicating a second developed state of the second area, and
  wherein the each image of the plurality of rectangular first areas, is an image capturing a region including each of the four corners of the rectangular first areas,
  performing an acceptable-or-not-acceptable determination for each of the plurality of rectangular first areas, acquiring information on exposure amounts corresponding respectively to rectangular first areas determined as acceptable, and determining a smallest exposure amount among the acquired exposure amounts as an exposure amount to be used.

8. An exposure apparatus configured to expose a substrate, the exposure apparatus comprising:
  an information processing apparatus configured to inspect a developed state of the substrate; and
  an image capturing unit configured to capture an image of the substrate,
  wherein the information processing apparatus includes an inspection unit configured to obtain a learning model learned using learning data including each image of a plurality of rectangular first areas captured in a state where the plurality of rectangular first areas exposed with each different amount of exposure without a mask on which a pattern is formed is developed and information indicating a first developed state of the plurality of rectangular first areas, and input an image of a second area captured in a state where the second area is developed after exposure to the learning model to acquire inspection data that include information indicating a second developed state of the second area, and
  wherein the each image of the plurality of rectangular first areas, is an image capturing a region including each of four corners of the rectangular first areas,
  wherein the inspection unit performs an acceptable-or-not-acceptable determination for each of the plurality of rectangular first areas, acquires information on exposure amounts corresponding respectively to rectangular first areas determined as acceptable, and determines a smallest exposure amount among the acquired exposure amounts as an exposure amount to be used.

9. A method for manufacturing an article, the method comprising:
  obtaining a learning model learned using learning data including each image of a plurality of rectangular first areas captured in a state where the plurality of rectangular first areas exposed with each different amount of exposure without a mask on which a pattern is formed is developed and information indicating a first developed state of the plurality of rectangular first areas, and inputting an image of a second area captured in a state where the second area is developed after exposure to the learning model to acquire inspection data that include information indicating a second developed state of the second area;
  determining an exposure amount with which a substrate is to be exposed, based on the acquired inspection data;
  exposing the substrate with the determined exposure amount; and
  processing the exposed substrate,
  wherein the article is manufactured from the processed substrate, and
  wherein the each image of the plurality of rectangular first areas, is an image capturing a region including each of four corners of the rectangular first areas,
  performing an acceptable-or-not acceptable determination for each of the plurality of rectangular first areas, acquiring information on exposure amounts corresponding respectively to rectangular first areas determined as acceptable, and determining a smallest exposure amount among the acquired exposure amounts as an exposure amount to be used.

* * * * *